(12) United States Patent
Moss et al.

(10) Patent No.: US 11,736,673 B2
(45) Date of Patent: *Aug. 22, 2023

(54) METHODS AND APPARATUS FOR CAPTURING, PROCESSING AND/OR COMMUNICATING IMAGES

(71) Applicant: Nevermind Capital LLC, Wilmington, DE (US)

(72) Inventors: Alan McKay Moss, Laguna Beach, CA (US); Hector M. Medina, Laguna Beach, CA (US); Ryan Michael Sheridan, Rancho Cucamonga, CA (US); Matthew Yaeger, Tustin, CA (US); David Ibbitson, Garden Grove, CA (US); David Cole, Aliso Viejo, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,106

(22) Filed: Jun. 30, 2020

(65) Prior Publication Data

US 2021/0051307 A1    Feb. 18, 2021

Related U.S. Application Data

(63) Continuation of application No. 16/013,879, filed on Jun. 20, 2018, now Pat. No. 10,735,709.

(60) Provisional application No. 62/687,563, filed on Jun. 20, 2018, provisional application No. 62/652,870, filed on Apr. 4, 2018.

(51) Int. Cl.
*H04N 13/122* (2018.01)
*H04N 13/239* (2018.01)

(52) U.S. Cl.
CPC ........ *H04N 13/122* (2018.05); *H04N 13/239* (2018.05)

(58) Field of Classification Search
CPC .................................................. H04N 13/122
See application file for complete search history.

(56) References Cited

U.S. PATENT DOCUMENTS 10,735,709 B2 * 8/2020 Moss .................... H04N 13/239
2011/0242286 A1 * 10/2011 Pace ..................... H04N 13/133
348/47

(Continued)

*Primary Examiner* — Girumsew Wendmagegn
(74) *Attorney, Agent, or Firm* — Blank Rome LLP

(57) ABSTRACT

An unobstructed image portion of a captured image from a first camera of a camera pair, e.g., a stereoscopic camera pair including fisheye lenses, is combined with a scaled extracted image portion generated from a captured image from a second camera in the camera pair. An unobstructed image portion of a captured image from the second camera of the camera pair is combined with a scaled extracted image portion generated from a captured image from the first camera in the camera pair. As part of the combining obstructed image portions which were obstructed by part of the adjacent camera are replaced in some embodiments. In some embodiments, the obstructions are due to adjacent fisheye lens. In various embodiments fish eye lenses which have been cut to be flat on one side are used for the left and right cameras with the spacing between the optical axis approximating the spacing between the optical axis of a human person's eyes.

17 Claims, 18 Drawing Sheets

(56) References Cited

U.S. PATENT DOCUMENTS

2017/0078653 A1\* 3/2017 Bi ..................... G06T 19/006
2018/0160046 A1\* 6/2018 Nash ................ H04N 5/232935

\* cited by examiner

METHODS AND APPARATUS FOR CAPTURING, PROCESSING AND/OR COMMUNICATING IMAGES

RELATED APPLICATIONS

The present application is a continuation of U.S. patent application Ser. No. 16/013,879 filed Jun. 20, 2018 which claims the benefit of U.S. Provisional Patent Application Ser. No. 62/652,870 filed Apr. 4, 2018 and U.S. Provisional Patent Application Ser. No. 62/687,563 filed Jun. 20, 2018 with each of the listed applications being hereby expressly incorporated by reference in their entirety.

FIELD

The present invention relates to methods and apparatus for capturing, processing and/or communicating images, e.g., one or more pairs of images, which in some, but not necessarily all, embodiments may be stereoscopic image pairs.

BACKGROUND

Pairs of cameras are often used to capture images. For example, a camera pair may be used to capture a left image and a right image which are to be used as left and right eye images of a stereoscopic image pair, respectively, in a stereoscopic application.

Unfortunately, when cameras are mounted side by side, particularly when fish eye lenses are used, the field of view of the lens of the left camera of a stereoscopic camera pair may be partially obstructed by the lens of the right camera and vice versa. As a result, rather than capturing an image of an environment, the right camera may capture an image where the left portion of the image includes an image of a portion of the left camera lens. Similarly, the left camera may capture an image that includes a left portion that includes an image of a portion of the right camera lens. The problem of one lens partially obstructing the view of the lens of the adjacent camera can occur in a wide range of applications but is more pronounced when cameras are closely spaced as compared to when the cameras are further apart from each other.

In the case of stereoscopic camera pairs, the left and right cameras are often closely spaced and fisheye lenses are often used. The use of large fisheye lenses, which can be desirable in many applications, further complicates things since large fisheye lenses often protrude out further than smaller lenses. Another complication of using large fish eye lenses is that the large lenses may have a radius larger than the average spacing between the optical axis of an average human's eyes. This can result in the capture of images that differ from what an average human might be expected to perceive with his/her left and right eyes.

It would be desirable if methods and/or apparatus could be developed which would allow for side by side cameras to be used to capture images but which would allow an individual final image or images to include image content corresponding to an area which is obstructed by a the lens or camera body of an adjacent camera device. In addition it would be desirable if in at least some embodiments large lenses could be used for a stereoscopic camera pair while still allowing for an optical axis spacing approximating that of a human being.

SUMMARY

In accordance with various embodiments, cameras of a camera pair, e.g., a stereoscopic camera pair, are used to capture images. In some, but not necessarily all, embodiments the cameras of a stereoscopic camera pair are relatively close together, e.g., with the cameras' optical axis being spaced at or close to that of the eye spacing of an average human. Such camera spacing is not required for all embodiments. In some embodiments a left image, e.g., a left eye image, and a right image, e.g., a right eye image, are captured by left and right cameras of a stereoscopic camera pair.

Various features relate to how to capture stereo and process images that can be useful in providing a realistic stereo experience to a view where, because of camera and/or lens spacing resulting in obstructed views, it may not be possible to capture the same area of an environment with both left and right cameras of a stereo camera pair. In generating composite images, in at least some features also address the problem that the distance from a left camera and a right camera to an object in an environment will often be different and that such a difference in distance to an object may affect the size of an object in an image captured by a left or right camera.

In at least some cases the left and right cameras use fish eye lenses. The fish eye lens of the adjacent camera, in some embodiments, partially obstructs the field of view of the other camera in the camera pair. To address this problem a portion of the image captured by the adjacent camera is extracted, processed and combined with the unobstructed image portion captured by a camera. In this way the left camera supplies an image portion corresponding to a portion of the environment obstructed, from the field of view of the right camera, e.g., by the left camera lens. Similarly the right camera supplies an image portion corresponding to a portion of the environment obstructed, from the field of view of the left camera, e.g., by the right camera lens. Since objects captured by the left camera lens may be closer to the left camera lens then they are to the right camera, the left camera image portion may be, and sometimes is, processed, e.g., scaled, so that when the image portion captured by the left camera is combined with the unobstructed image portion captured by the right camera the objects captured by the left camera will appear in the processed image portion at a size corresponding to the size they would have been if captured by the right camera. The scaling normally, but not necessarily always, includes a scaling down operation as part of the image processing. The portion of the right image which is processed for combining with the left image is subject to a similar processing operation which often involves scaling so that the objects in the right image portion, that are combined with the unobstructed left image portion, are of size that they would be if they were captured by the left camera.

An exemplary image processing method, in accordance with some embodiments, comprises: receiving a left image, optionally including a first obstructed image portion, receiving a right image; and generating a composite left image by combining a first unobstructed image portion with a processed portion of said right image. The combining may, and sometimes does, involve replacing an obstructed image portion with the processed right image portion. Note that in some cases depending on the lens shape, the left image may or may not include an obstructed image portion. For example, if the left lens is non-uniform and includes a cut away portion, there may not be an obstructed image portion, but the field of view may still be less than if a full uncut lens was used, and there was no adjacent camera. In such a case the method may still involve generating a composite image but there would be no obstructed image portion or a small obstructed image portion to be replaced to generate the composite image.

In some, but not necessarily all, embodiments, camera lenses which are cut on one side are used as left and right camera lenses. The cutting of the lens on one side allows the lenses to be spaced close together, e.g., with an optical axis spacing that matches or is close to that of a human being. In some such embodiments different sensors are used for the left and right cameras but image capture by the sensors is synchronized. In other embodiments a single large sensor is used to capture light that passes through the left camera lens and light which passes through the right camera lens. In such an embodiment by using a single large sensor to capture both left and right images, synchronization of the captured images is readily achieved since the rows of pixel elements of a single sensor capture both the left and right eye images.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

DETAILED DESCRIPTION

Figure 1:
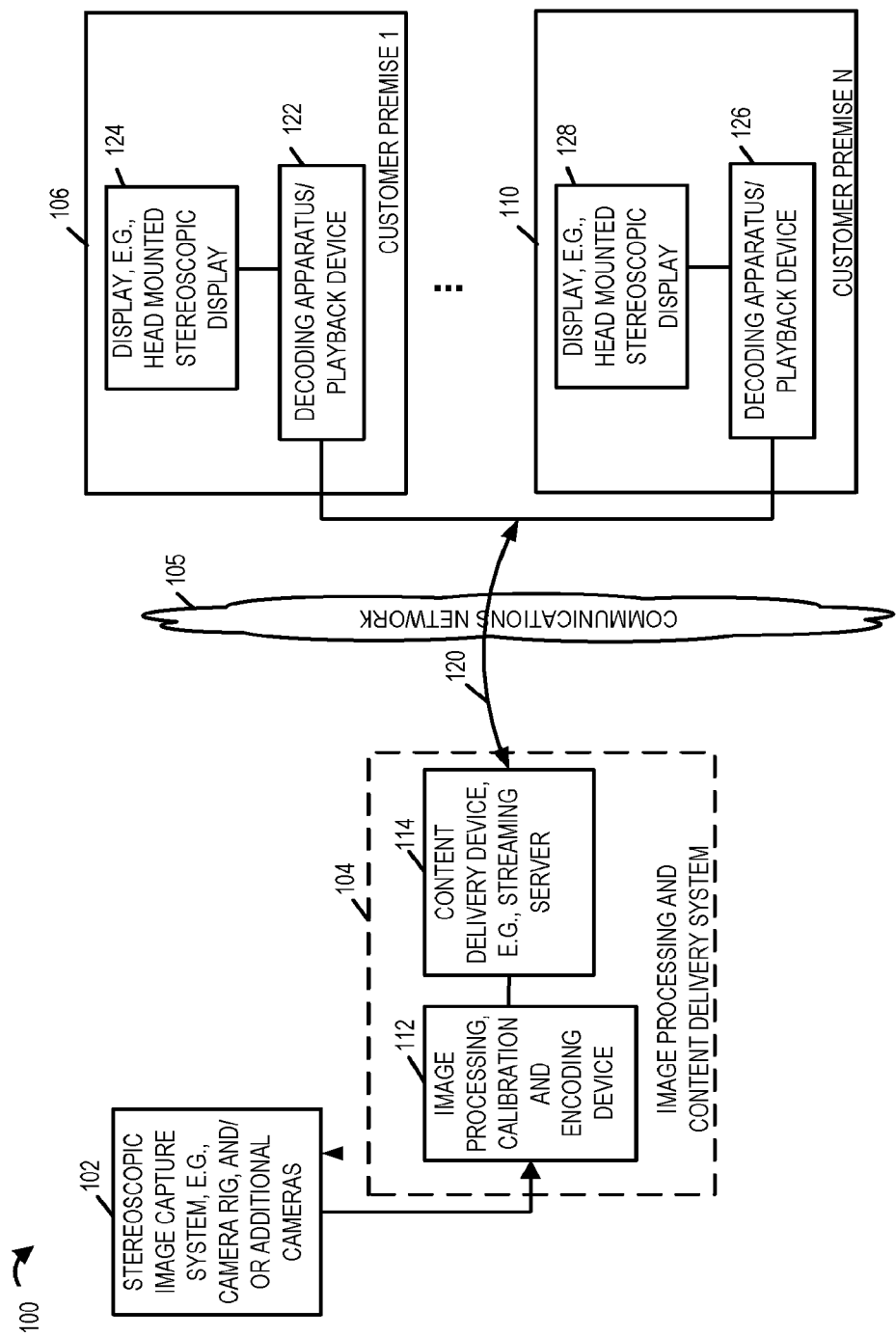
FIG. 1 illustrates an exemplary system implemented in accordance with some embodiments of the invention which can be used to capture, stream content, and output content to one or more users in a synthesized environment.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The image processing and content delivery system 104 includes an image processing, calibration and encoding apparatus 112 and a content delivery device 114, e.g. a streaming server. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/or environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be, and sometimes is, a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that although a single camera rig 102 is shown in FIG. 1, multiple camera rigs may be present in the system and located at different physical locations at a sporting or other event with the user being able to switch between the different positions and with the user selections being communicated from the playback device, e.g., playback device 122, to the content server 114. While separate devices 112, 114 are shown in the image processing and content delivery system 104, it should be appreciated that the system 104 may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used to implement the encoding apparatus 112.

Each customer premise 106, 110 may include a plurality of devices/players, e.g., decoding apparatus to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 400 shown in FIG. 4. A system/playback device such as the one illustrated in FIG. 4 can be used as any of the decoding apparatus/playback devices 122, 126.

Figure 2:
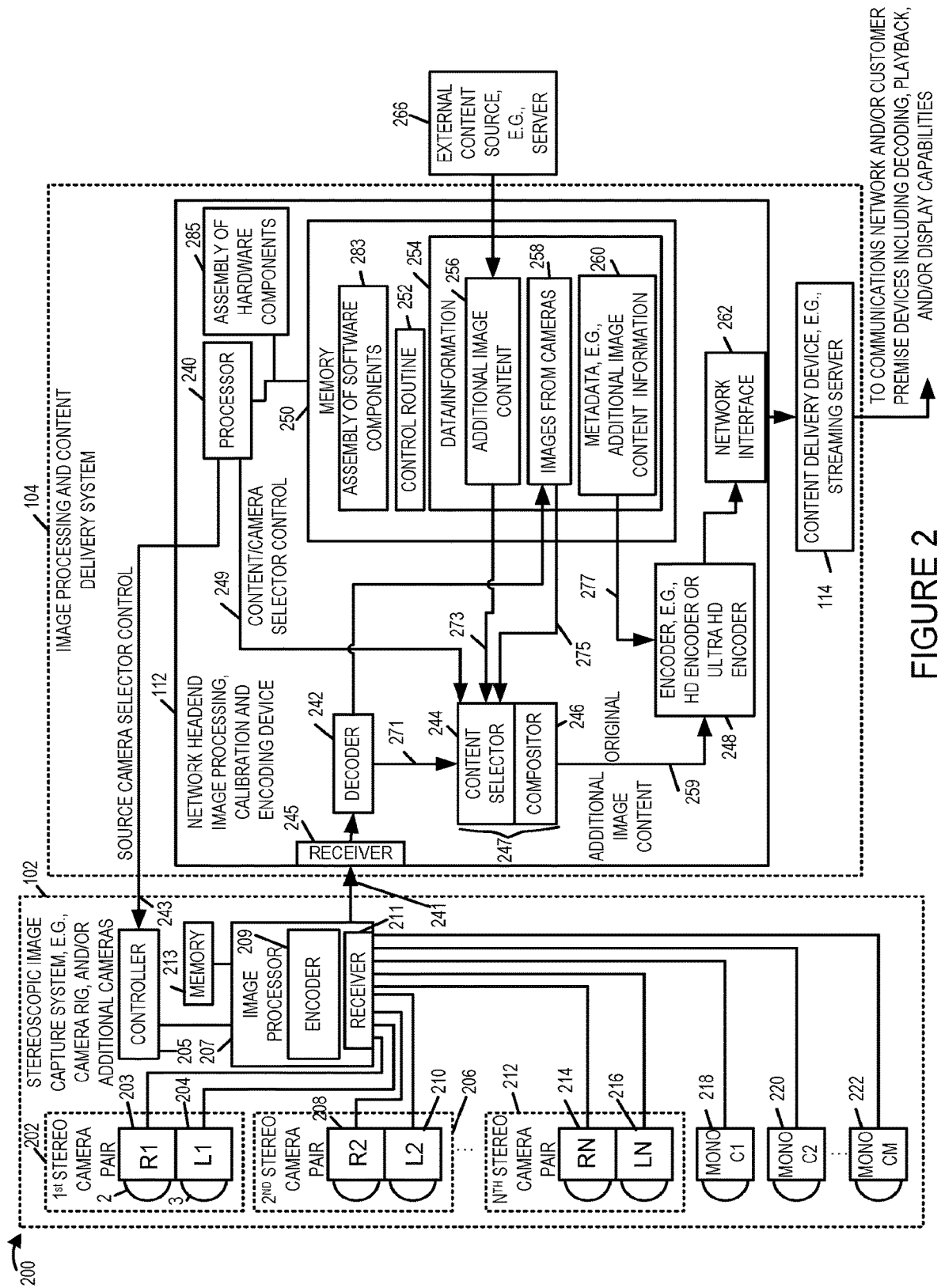
FIG. 2 illustrates the exemplary image capture system and the exemplary image processing and content delivery system of FIG. 1 in more detail in accordance with an exemplary embodiment.

FIG. 2 is a drawing 200 which illustrates the exemplary image capture system 102 and the exemplary image processing and content delivery system 104 of FIG. 1 in more detail in accordance with an exemplary embodiment. Drawing 200 of FIG. 2 further illustrates an external content source 266, e.g., a server, which supplies external content, which can be, and sometimes is, incorporated into a frame that includes a captured image of a portion of an environment. The server 266 may be, and sometimes is, the source of additional image content to be included in a composite image. The additional image content may be a wide variety of different types of content such as billboard score information, advertisements or content by a different camera than that of a main image included in a frame. The stereoscopic image capture system 102 of the system 200 can, and often does, include a plurality of stereoscopic camera pairs, e.g., first stereo camera pair 202, second stereo camera pair 206, . . . , Nth stereo camera pair 212. Each of the stereo camera pairs 202, 206, 212 includes a pair of left and right cameras (204, 203), (210, 208) and (216, 214). The left and right cameras capture left and right eye images of a portion of an environment at which the cameras of an individual camera pair are directed. By orienting different camera pairs in different directions a 360 degree image capture around the camera system is achieved in some embodiments. In addition to the stereo camera pairs (202, 206, 212) the image capture system 102 includes a plurality of mono cameras C1 218, C2 220, to camera CM 222. The mono cameras may be used in place of or in addition to the stereo camera pairs. For example mono image capture may be used for the ground and/or sky which may be of lower priority in some embodiments than in others. The left and right cameras of the stereo camera pairs 202, 206, 212 and the mono cameras 218, 220, 222 may, and in at least some embodiments do, use fish eye lenses which can capture a wide field of view. While fisheye lenses capture a wide field of view the capture image of the environment often only occupies a central portion of an image sensor, e.g., a circular center portion. Consider for example the captured image portion by a camera may only occupy a center portion area with the additional image area available in a frame going to waste since light from the fisheye lens, used in some embodiments, is directed to the center portion of the sensor and not the edge portions.

Images captured by the cameras of the image capture system 102 are supplied to an image processor 207 which includes a receiver 211 and an encoder 209. In some embodiments the encoder 209 is a distribution encoder but in other embodiments the encoder 209 encodes pairs of composite images generated in accordance with the invention, e.g., as a single frame. In the case where the encoder 209 is a distribution encoder it encodes highly accurate versions of captured images to the image processing system 112 which receives and then processes the images in accordance with the invention, e.g., to generate and send composite images. Thus is should be appreciated that the methods of processing and generating composite images can be performed by the processor 207 or the processor 240 depending on where the composite images are being generated.

The receiver 211 receives captured images from the various cameras being used in the set of cameras (203, 204, 208, 210, 214, 216, 218, 220, . . . 222). The distribution encoder 209 encodes the captured images from the various cameras being used and then transmits them to the image processing and content delivery system 104 as represented by the arrow 241. While the image processing system 207 may encode and communicate the content from all cameras to the image processing and content delivery system 104 on an ongoing basis, due to bandwidth constraints it may be desirable to communicate a limited number of camera feeds at a given time. Controller 205 is coupled via line 243 to a processor 240 of the image processing system 104 and is connected to the image processor 207. The image processor 207 is coupled to memory 213 which can store images as well as various modules. The controller 205 can, and sometimes does, receive a source camera selector control signal via line 243 which it then responds to by controlling the image processor 207 to encode and send selected camera feeds, e.g., captured images from one or more stereo camera pairs and/or mono cameras to the image processing system 104 in encoded format.

The image processing and content delivery system 104 includes, in addition to processor 240, a receiver 245, a decoder 242, content selector and compositor device 247, an encoder 248, an assembly of hardware components 285, e.g., an assembly of circuits, memory 250 and network interface 262. The processor 240 controls operation of the image processing and content delivery system 104 and also sends source camera selector control signals to the image capture system 102, via line 243, to control which camera feeds are provided to the image processing sand content delivery system 104 for processing at a given time. The processor 240 is coupled to the memory 250 and also to the content selector 244 of the content selector and compositor device 247. Processor 240, sends content selector control signal 249 to content selector 244, content selector 244 receives the content selector control signal 249. In this way the processor 240 can and does control the supply of image content from memory 250 to the content selector 244 which supplies the content to the compositor portion 246 of the content selector and compositor device 247. The compositor 246 will combine images from one or more cameras and/or additional image content to generate a frame which is then encoded along with corresponding metadata by encoder 248. A single captured image frame may be combined with additional image content, e.g., with the additional image content being placed in a location of a frame which does not include the captured portion of the environment captured using a fish eye lens. The additional content may be a portion of an image captured by another one of the cameras 218, 220, 222 or a camera of a camera pair, content such as a score to be displayed on a billboard and/or an advertisement for example. While individual frames may be encoded separately, in some embodiments multiple frames, including a captured image of the environment and/or additional image content, may be, and sometimes are, combined into a single HD or UHD frame, as will be explained further below, which is then encoded as a single frame by the encoder 248. Since the compositing is done by compositor 246 from the perspective of the encoder 248 it receives and encodes a sequence of individual frames which may or may not be composite frames. The encoder 248 can be, and sometimes is, an MPEG HD or Ultra HD video encoder but any of a wide variety of encoders 248 could be used.

The memory 250, which is coupled to processor 240, includes a control routine 252 which when executed by the processor 240 causes the processor 240 to control the image processing and content delivery system 104 to implement the methods of the present invention. Memory 250 further includes an assembly of software components 283. Memory 250 stores additional image content 256 received from external content source 266 and supplies it under control of the processor 240 to content selector 244 for inclusion in one or more frames which are to be generated and output from the compositor 246. The memory 250 also stores images 258 from the cameras of the image capture system 102 which are obtained from the decoder 242 which decodes the encoded images provided by the image capture system and stores them in memory 250. The content selector and compositor 247 receives additional image content and images from the cameras and generates, under direction of processor 240, composite frames there from which are then supplied by the compositor 246 to the encoder 248. Memory 250 also includes metadata 260 which is supplied to the encoder 248 for encoding and communication with encoded frames to which the metadata relates. The metadata 260 may indicate, for example, how additional image content is to be used during rendering to generate an image to be displayed to a user and may identify one or more UV maps and/or mesh models to be used for a particular image that is generated by the encoder and/or mesh correction information to be used when rendering an output image from encoded image content. The metadata 260 may, and sometimes does, indicate how captured images and/or additional image content has been packaged into an encoded frame thereby providing a playback device information on how to recover various image portions from an encoded frame so that the image content can be used as textures during image rendering. As part of the rendering processes portions of a frame are applied to a model or models as textures and the resulting image is then displayed. Additional image content communicated in a portion of a frame which might go unused since it is not used to communicate image content captured by a fish eye lens, e.g., a corner portion of a frame, may be, and sometimes, is combined with image content captured by a fish eye lens and communicated in a frame. In this way what might otherwise be wasted frame portions is used in an efficient manner with additional content being communicated in the same frame including a captured image of a portion of an environment with which the additional image content is to be combined.

Encoded image frames generated by the encoder 248 which may, and often will, include additional image content and corresponding metadata, are output by the encoder 248 and supplied via network interface 262 to the content delivery device 114 for delivery, e.g., streaming, to one or more playback devices via a communications network.

Figure 3:
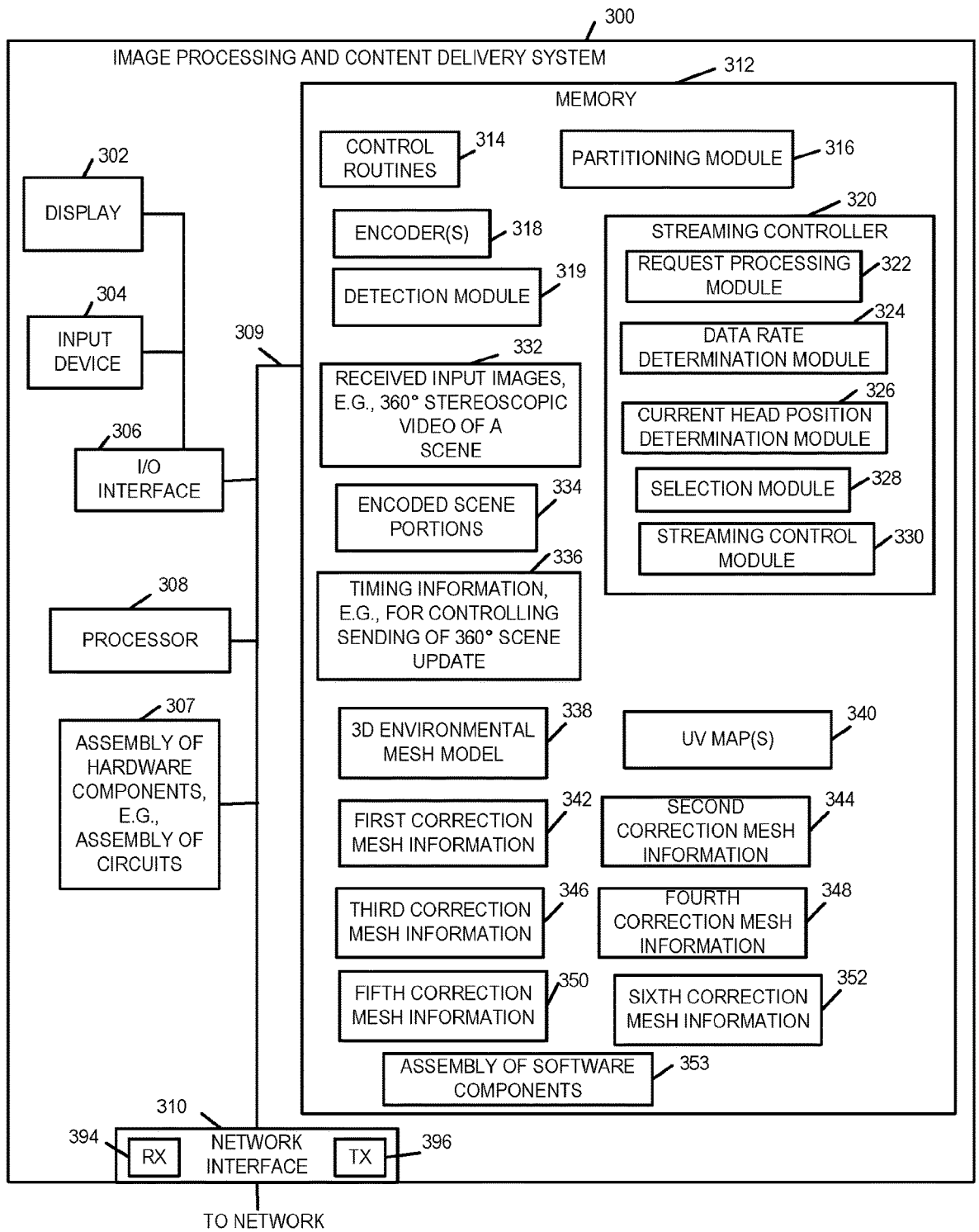
FIG. 3 illustrates an exemplary image processing and content delivery system including encoding capability that can be used to encode and stream content in accordance with the features of the invention.

FIG. 3 illustrates an exemplary image processing and content delivery system 300 with encoding capability that can be used to encode and stream content in accordance with the features of the invention.

The system 300 may be used to perform encoding, storage, and transmission and/or content output in accordance with the features of the invention. The image processing and content delivery system 300 may be used as the system 104 of FIG. 1. While the system shown in FIG. 3 is used for encoding, processing and streaming of content, it should be appreciated that the system 300 may also include the ability to decode and display processed and/or encoded image data, e.g., to an operator.

The system 300 includes a display 302, input device 304, input/output (I/O) interface 306, an assembly of hardware components 307, e.g., an assembly of circuits, a processor 308, network interface 310 including a receiver 394 and a transmitter 396 and a memory 312. The various components of the system 300 are coupled together via bus 309 which allows for data to be communicated between the components of the system 300.

The memory 312 includes various modules, e.g., routines, which when executed by the processor 308 control the system 300 to implement the partitioning, encoding, storage, and streaming/transmission and/or output operations in accordance with the invention.

The memory 312 includes various modules, e.g., routines, which when executed by the processor 308 control the computer system 300 to implement the immersive stereoscopic video acquisition, encoding, storage, and transmission and/or output methods in accordance with the invention. The memory 312 includes control routines 314, a partitioning module 316, encoder(s) 318, a detection module 319, a streaming controller 320, received input images 332, e.g., 360 degree stereoscopic video of a scene, encoded scene portions 334, timing information 336, an environmental mesh model 338, UV maps(s) 340 and a plurality of correction mesh information sets including first correction mesh information 342, second correction mesh information 344, third correction mesh information 346, fourth correction mesh information 348, fifth correction mesh information 350 and sixth correction mesh information 352. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware. The memory 312 further includes an assembly of software components 353.

The control routines 314 include device control routines and communications routines to control the operation of the system 300. The partitioning module 316 is configured to partition a received stereoscopic 360 degree version of a scene into N scene portions in accordance with the features of the invention.

The encoder(s) 318 may, and in some embodiments do, include a plurality of encoders configured to encode received image content, e.g., 360 degree version of a scene and/or one or more scene portions in accordance with the features of the invention. In some embodiments encoder(s) 318 include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 318 is the encoded scene portions 334 which are stored in the memory for streaming to customer devices, e.g., playback devices. The encoded content can be streamed to one or multiple different devices via the network interface 310.

The detection module 319 is configured to detect a network controlled switch from streaming content from a current camera pair, e.g., first stereoscopic camera pair, to another camera pair, e.g., a second or third stereoscopic camera pair. That is the detection module 319 detects if the system 300 has switched from streaming content stream generated using images captured by a given stereoscopic camera pair, e.g., a first stereoscopic camera pair, to streaming content stream generated using images captured by another camera pair. In some embodiments the detection module 319 is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 320 is configured to control streaming of encoded content for delivering the encoded image content to one or more customer devices, e.g., over the communications network 105.

The streaming controller 320 includes a request processing module 322, a data rate determination module 324, a current head position determination module 326, a selection module 328 and a streaming control module 330. The request processing module 322 is configured to process a received request for imaging content from a customer playback device. The request for content is received in various embodiments via a receiver 394 in the network interface 310. In some embodiments the request for content includes information indicating the identity of requesting playback device. In some embodiments the request for content may include data rate supported by the customer playback device, a current head position of the user, e.g., position of the head mounted display. The request processing module 322 processes the received request and provides retrieved information to other elements of the streaming controller 320 to take further actions. While the request for content may include data rate information and current head position information, in various embodiments the data rate supported by the playback device can be determined from network tests and other network information exchange between the system 300 and the playback device.

The data rate determination module 324 is configured to determine the available data rates that can be used to stream imaging content to customer devices, e.g., since multiple encoded scene portions are supported the content delivery system 300 can support streaming content at multiple data rates to the customer device. The data rate determination module 324 is further configured to determine the data rate supported by a playback device requesting content from system 300. In some embodiments the data rate determination module 324 is configured to determine available data rate for delivery of image content based on network measurements.

The current head position determination module 326 is configured to determine a current viewing angle and/or a current head position of the user, e.g., position of the head mounted display, from information received from the playback device. In some embodiments the playback device periodically sends current head position information to the system 300 where the current head position determination module 326 receives and processes the information to determine the current viewing angle and/or a current head position.

The selection module 328 is configured to determine which portions of a 360 degree scene to stream to a playback device based on the current viewing angle/head position information of the user. The selection module 328 is further configured to select the encoded versions of the determined scene portions based on available data rate to support streaming of content.

The streaming control module 330 is configured to control streaming of image content, e.g., multiple portions of a 360 degree stereoscopic scene, at various supported data rates in accordance with the features of the invention. In some embodiments the streaming control module 330 is configured to control stream N portions of a 360 degree stereoscopic scene to the playback device requesting content to initialize scene memory in the playback device. In various embodiments the streaming control module 330 is configured to send the selected encoded versions of the determined scene portions periodically, e.g., at a determined rate. In some embodiments the streaming control module 330 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 330 waits for a predetermined time after initially sending N scene portions for initialization before sending the 360 degree scene update. In some embodiments the timing information to control sending of the 360 degree scene update is included in the timing information 336. In some embodiments the streaming control module 330 is further configured identify scene portions which have not been transmitted to the playback device during a refresh interval; and transmit an updated version of the identified scene portions which were not transmitted to the playback device during the refresh interval.

In various embodiments the streaming control module 330 is configured to communicate at least a sufficient number of the N portions to the playback device on a periodic basis to allow the playback device to fully refresh a 360 degree version of said scene at least once during each refresh period.

In some embodiments streaming controller 320 is configured to control the system 300 to transmit, e.g., via a transmitter 396 in the network interface 310, a stereoscopic content stream (e.g., encoded content stream 334) including encoded images generated from image content captured by one or more cameras, e.g., cameras of stereoscopic camera pairs. In some embodiments streaming controller 320 is configured to control the system 300 to transmit, to one or more playback devices, an environmental mesh model 338 to be used in rendering image content. In some embodiments streaming controller 320 is further configured to transmit to a playback device a first UV map to be used for mapping portions of images captured by a first stereoscopic camera pair to a portion of the environmental mesh model as part of a image rendering operation.

In various embodiments the streaming controller 320 is further configured to provide (e.g., transmit via a transmitter 396 in the network interface 310) one or more sets of correction mesh information, e.g., first, second, third, fourth, fifth, sixth, correction mesh information to a playback device. In some embodiments the first correction mesh information 342 is for use in rendering image content captured by a first camera of a first stereoscopic camera pair, the second correction mesh information 344 is for use in rendering image content captured by a second camera of the first stereoscopic camera pair, the third correction mesh information 346 is for use in rendering image content captured by a first camera of a second stereoscopic camera pair, the fourth correction mesh information 348 is for use in rendering image content captured by a second camera of the second stereoscopic camera pair, the fifth correction mesh information 350 is for use in rendering image content captured by a first camera of a third stereoscopic camera pair, the sixth correction mesh information 352 is for use in rendering image content captured by a second camera of the third stereoscopic camera pair. In some embodiments the streaming controller 320 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 320 is further configured to indicate to the playback device that the third and fourth correction mesh information should be used in response to the detection module 319 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 312 further includes the environmental mesh model 338, UV map(s) 340, and sets of correction mesh information including first correction mesh information 342, second correction mesh information 344, third correction mesh information 346, fourth correction mesh information 348, fifth correction mesh information 350 and sixth correction mesh information 352. The system 300 provides the environmental mesh model 338 to one or more playback devices for use in rendering image content. The UV map(s) 340 include at least a first UV map to be used for mapping portions of images captured by the first stereoscopic camera pair to a portion of the environmental mesh model 338 as part of a image rendering operation. The first correction mesh information 342 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 308 is configured to perform the various functions corresponding to a method. In some embodiments the processor 308 uses routines and information stored in memory to perform various functions and control the system 300 to operate in accordance with the methods of the present invention. In one embodiments the processor 308 is configured to control the system 300 to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor 308 is further configured to control the system 300 to transmit a stereoscopic content stream including encoded images generated from image content captured by the first and second cameras. In some embodiments the processor 308 is further configured to transmit to the playback device an environmental mesh model to be used in rendering image content. In some embodiments the processor 308 is further configured to transmit to the playback device a first UV map to be used for mapping portions of images captured by the first stereoscopic camera pair to a portion of the environmental mesh model as part of a image rendering operation. In some embodiments the processor 308 is further configured to control the system 300 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 308 is further configured to control the system 300 to indicate (e.g., transmit via network interface 310) to the playback device that the third and fourth correction mesh information should be used when content captured by the second camera pair is streamed to the playback device instead of content from the first camera pair. In some embodiments the processor 308 is further configured to control the system 300 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 308 is further configured to control the system 300 to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

Figure 4:
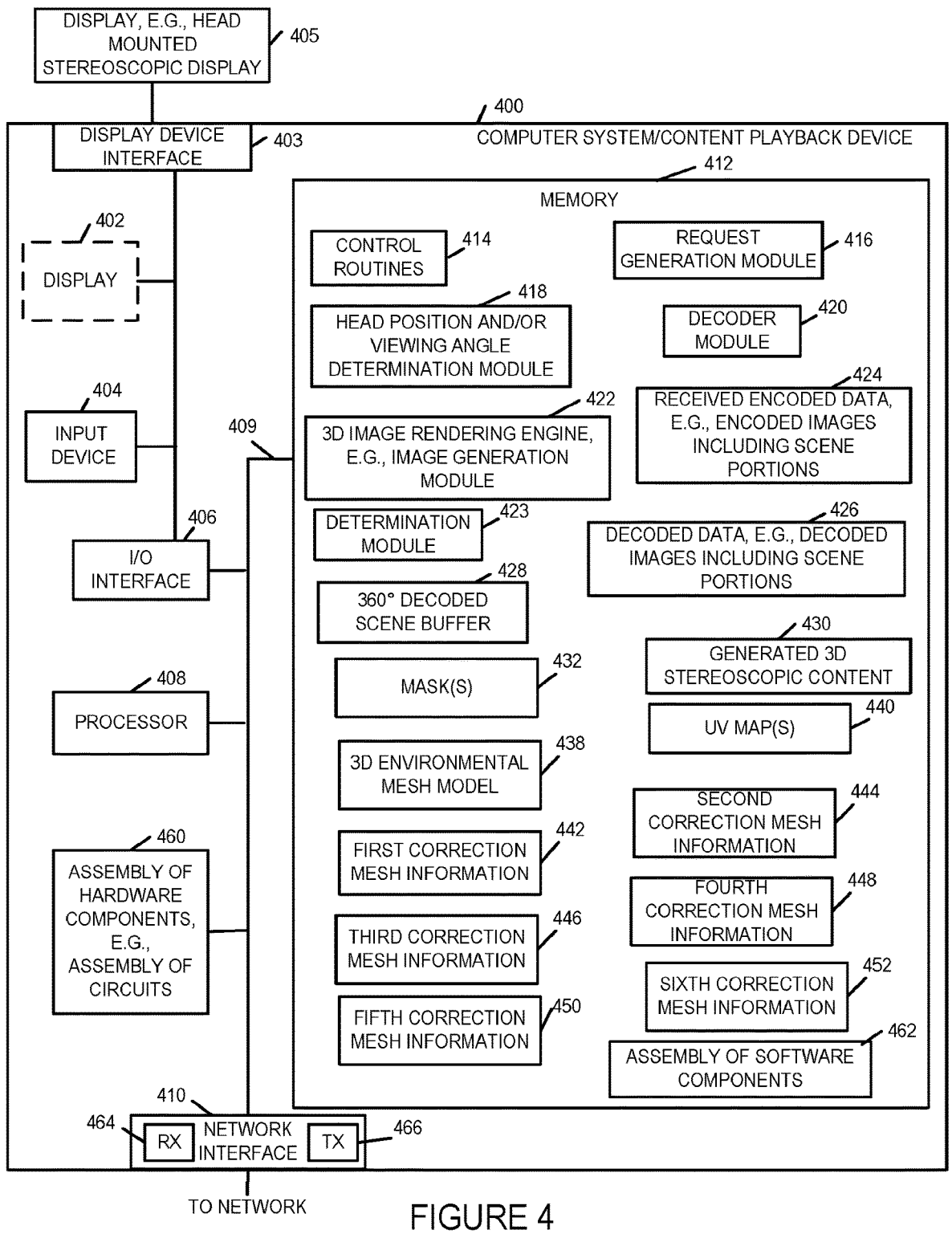
FIG. 4 illustrates an exemplary computer system/content playback device that can be used to receive, decode and display the content streamed by the system of FIG. 3.

FIG. 4 illustrates a computer system/playback device 400 implemented in accordance with the present invention which can be used to receive, decode, store and display imaging content received from a content delivery system such as the one shown in FIG. 1. The playback device may be used with a 3D head mounted display such as the OCULUS RIFT™ VR (virtual reality) headset which may be the head mounted display 405. The device 400 includes the ability to decode the received encoded image data and generate 3D image content for display to the customer. The playback device 400 in some embodiments is located at a customer premise location such as a home or office but may be located at an image capture site as well. The device 400 can perform signal reception, decoding, display and/or other operations in accordance with the invention.

The device 400 includes a display 402, a display device interface 403, input device 404, input/output (I/O) interface 406, a processor 408, an assembly of hardware components 460, e.g., an assembly of circuits, network interface 410 and a memory 412. The various components of the playback device 400 are coupled together via bus 409 which allows for data to be communicated between the components of the system 400. While in some embodiments display 402 is included as an optional element as illustrated using the dashed box, in some embodiments an external display device 405, e.g., a head mounted stereoscopic display device, can be coupled to the playback device via the display device interface 403.

Via the I/O interface 406, the system 400 can be coupled to external devices to exchange signals and/or information with other devices. In some embodiments via the I/O interface 406 the system 400 can receive information and/or images from an external device and output information and/or images to external devices. In some embodiments via the interface 406 the system 400 can be coupled to an external controller, e.g., such as a handheld controller.

The processor 408, e.g., a CPU, executes routines 414 and modules in memory 412 and uses the stored information to control the system 400 to operate in accordance with the invention. The processor 408 is responsible for controlling the overall general operation of the system 400. In various embodiments the processor 408 is configured to perform functions that have been discussed as being performed by the playback system 400.

Via the network interface 410 the system 400 communicates and/or receives signals and/or information (e.g., including encoded images and/or video content corresponding to a scene) to/from various external devices over a communications network, e.g., such as communications network 105. Network interface 410 includes a receiver (RX) 464 and a transmitter (TX) 466. In some embodiments the system 400 receives one or more content streams including encoded images captured by one or more different cameras via the network interface 410 from the content delivery system 300. The received content stream may be stored as received encoded data, e.g., encoded images 424. In some embodiments the interface 410 is configured to receive a first encoded image including image content captured by a first camera and a second encoded image corresponding to a second camera. The network interface 410 includes a receiver 464 and a transmitter 466 via which the receiving and transmitting operations are performed. In some embodiments the interface 410 is configured to receive correction mesh information corresponding to a plurality of different cameras including first correction mesh information 442, second correction mesh information 444, third correction mesh information 446, fourth correction mesh information 448, fifth correction mesh information 450 and sixth correction mesh information 452 which are then stored in memory 412. Furthermore in some embodiments via the interface 410 the system receives one or more mask(s) 432, an environmental mesh model 438, UV maps(s) 440 which are then stored in memory 412.

The memory 412 includes various modules, e.g., routines, which when executed by the processor 408 control the playback device 400 to perform decoding and output operations in accordance with the invention. The memory 412 includes assembly of software components 462, control routines 414, a request for content generation module 416, a head position and/or viewing angle determination module 418, a decoder module 420, a stereoscopic image rendering engine 422 also referred to as a 3D image generation module, a determination module 423, and data/information including received encoded image content 424, decoded image content 426, a 360 degree decoded scene buffer 428, generated stereoscopic content 430, mask(s) 432, an environmental mesh model 438, UV maps(s) 440 and a plurality of received correction mesh information sets including first correction mesh information 442, second correction mesh information 444, third correction mesh information 446, fourth correction mesh information 448, fifth correction mesh information 450 and sixth correction mesh information 452.

The control routines 414 include device control routines and communications routines to control the operation of the device 400. The request generation module 416 is configured to generate a request for content to send to a content delivery system for providing content. The request for content is sent in various embodiments via the network interface 410. The head position and/or viewing angle determination module 418 is configured to determine a current viewing angle and/or a current head position of the user, e.g., position of the head mounted display, and report the determined position and/or viewing angle information to the content delivery system 300. In some embodiments the playback device 400 periodically sends current head position information to the system 300.

The decoder module 420 is configured to decode encoded image content 424 received from the content delivery system 300 to produce decoded image data, e.g., decoded images 426. The decoded image data 426 may include decoded stereoscopic scene and/or decoded scene portions. In some embodiments the decoder 420 is configured to decode the first encoded image to generate a first decoded image and decode the second received encoded image to generate a second decoded image. The decoded first and second images are included in the stored decoded image images 426.

The 3D image rendering engine 422 performs the rendering operations (e.g., using content and information received and/or stored in memory 412 such as decoded images 426, environmental mesh model 438, UV map(s) 440, masks 432 and mesh correction information) and generates 3D image in accordance with the features of the invention for display to the user on the display 402 and/or the display device 405. The generated stereoscopic image content 430 is the output of the 3D image generation engine 422. In various embodiments the rendering engine 422 is configured to perform a first rendering operation using the first correction information 442, the first decoded image and the environmental mesh model 438 to generate a first image for display. In various embodiments the rendering engine 422 is further configured to perform a second rendering operation using the second correction information 444, the second decoded image and the environmental mesh model 438 to generate a second image for display. In some such embodiments the rendering engine 422 is further configured to use a first UV map (included in received UV map(s) 440) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 422 is further configured to use a first mask (included in mask(s) 432) to determine how portions of the first image are combined with portions of a first image corresponding to a different field of view as part of the first rendering operation when applying portions of the first image to a surface of the environmental mesh model as part of the first rendering operation. In some embodiments the rendering engine 422 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 430 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 422 renders the 3D image content 430 to the display. In some embodiments the operator of the playback device 400 may control one or more parameters via input device 404 and/or select operations to be performed, e.g., select to display 3D scene.

The network interface 410 allows the playback device 400 to receive content from the streaming device 114 and/or communicate information such as view head position and/or position (camera rig) selection indicating selection of particular viewing position at an event. In some embodiments the decoder 420 is implemented as a module. In such embodiments when executed the decoder module 420 causes received images to be decoded while 3D image rendering engine 422 causes further processing of the images in accordance with the present invention and optionally stitching of images together as part of the presentation process.

In some embodiments the interface 410 is further configured to receive additional mesh correction information corresponding to a plurality of different cameras, e.g., third, fourth, fifth and sixth mesh correction information. In some embodiments the rendering engine 422 is further configured to use mesh correction information corresponding to a fourth camera (e.g., fourth mesh correction information 448) when rendering an image corresponding to a fourth camera, the fourth camera being one of the plurality of different cameras. The determination module 423 is configured to determine which mesh correction information is to be used by the rendering engine 422 when performing a rendering operation based on which camera captured image content is being used in the rendering operation or based an indication from a server indicating which mesh correction information should be used when rendering images corresponding to a received content stream. The determination module 423 may be implemented as part of the rendering engine 422 in some embodiments.

In some embodiments the modules and/or elements shown in the memory 312 of FIG. 3 and memory 412 of FIG. 4 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 3 and 4 to be included in the memory, the elements shown included in the system 300 and 400 can, and in some embodiments are, implemented fully in hardware within the processor, e.g., as individual circuits, of the corresponding device, e.g., within the processor 308 in case of the content delivery system 300 and within the processor 408 in the case of playback system 400. In other embodiments some of the elements are implemented, e.g., as circuits, within the corresponding processors 308 and 408 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 300 and 400 to implement the functions corresponding to the modules when the modules are executed by their respective processors, e.g., processors 308 and 408. In still other embodiments, various elements are implemented as a combination of hardware and software, e.g., with a circuit external to the processor providing input to the processor which then under software control operates to perform a portion of a module's function.

While shown in each of FIGS. 3 and 4 embodiments as a single processor, e.g., computer, it should be appreciated that each of the processors 308 and 408 may be implemented as one or more processors, e.g., computers. When one or more elements in the memory 312 and 412 are implemented as software modules, the modules include code, which when executed by the processor of the corresponding system (e.g., processor 308 and 408) configure the processor to implement the function corresponding to the module. In embodiments where the various modules shown in FIGS. 3 and 4 are stored in memory, the memory is a computer program product comprising a computer readable medium comprising code, e.g., individual code for each module, for causing at least one computer, e.g., processor, to implement the functions to which the modules correspond.

Figure 5:
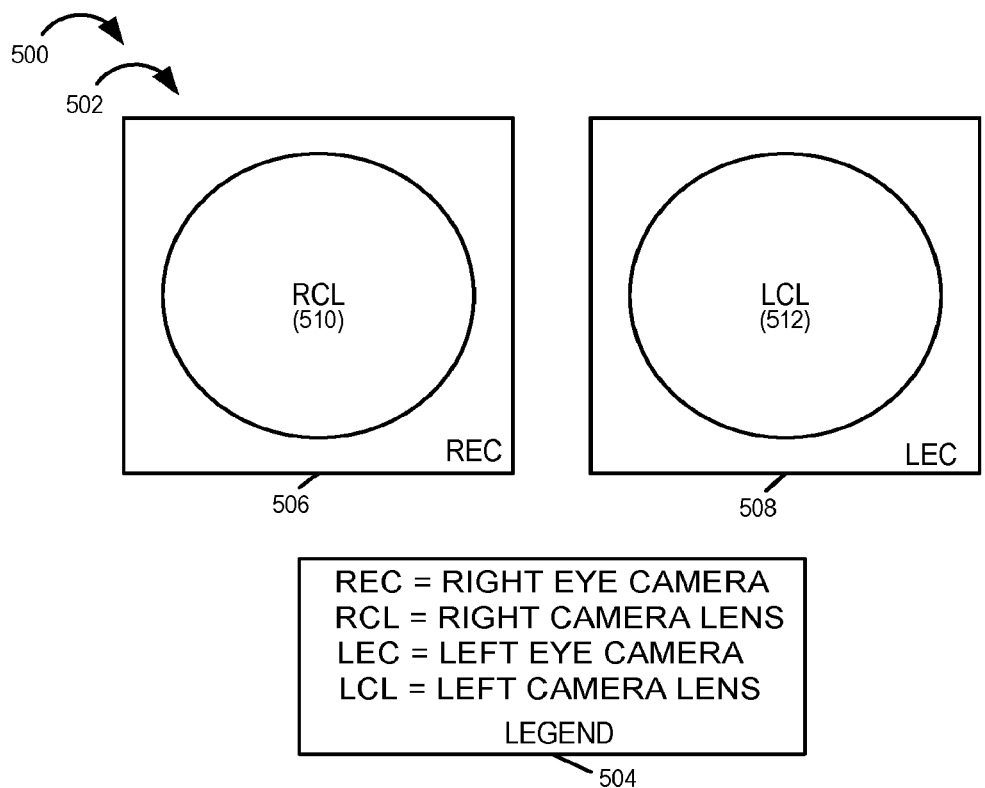
FIG. 5 illustrates an exemplary camera pair, e.g., a stereoscopic camera pair, in accordance with an exemplary embodiment.

FIG. 5 is a drawing 500 illustrating an exemplary camera pair 502, e.g., a stereoscopic camera pair, and a corresponding legend 504, in accordance with an exemplary embodiment. In some embodiments, the exemplary camera pair 502 is one of the camera pairs 202, 206, 212 of capture system 102 of FIG. 2. Exemplary camera pair 502 includes a right eye camera (REC) 506 and a left eye camera (LEC) 508. Right eye camera 506 includes right camera lens (RCL) 510, e.g., a fisheye lens. Left eye camera 508 includes left camera lens (LCL) 512, e.g., a fisheye lens. Legend 504 indicates that: REC=right eye camera, RCL=right camera lens, LEC=left eye camera, and LCL=left camera lens. In one exemplary embodiment left eye camera 508 of FIG. 5 is left camera 204 of FIG. 2; right eye camera 506 of FIG. 5 is right camera 203 of FIG. 2; left camera lens 512 of FIG. 5 is left camera lens 3 of FIG. 2; and right camera lens 510 of FIG. 5 is right camera lens 2 of FIG. 2.

Figure 6:
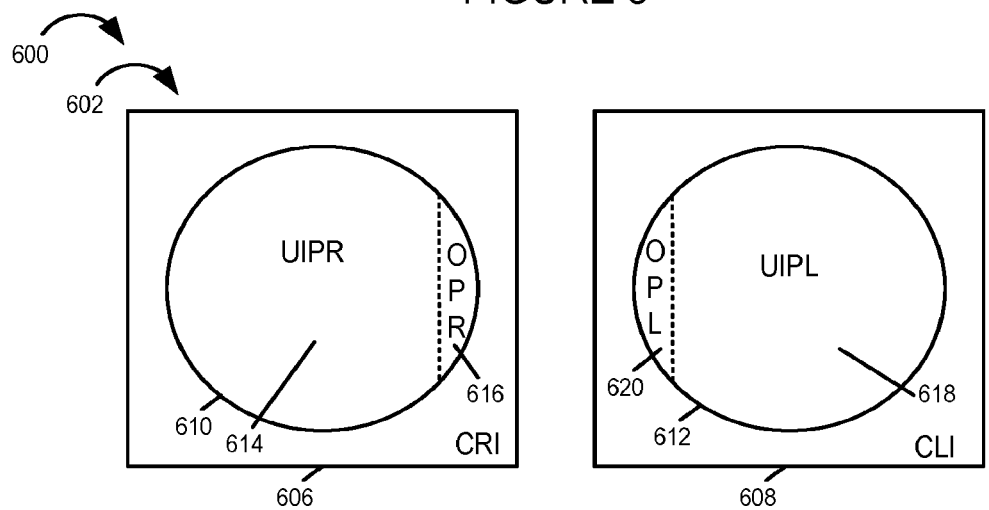
FIG. 6 illustrates exemplary captured images includes obstructed image portions in accordance with an exemplary embodiment.

FIG. 6 is a drawing 600 which illustrates an exemplary captured image pair 602 which includes obstructed image portions, and a corresponding legend 604 in accordance with an exemplary embodiment. The captured image pair 602 may be captured by the camera pair 502 of FIG. 5. Exemplary captured image pair 602 includes a captured right image (CRI) 606 and a captured left image (CLI) 608. The captured right image 606, which is captured by the right camera sensor or right camera sensor portion, includes an image capture portion 610 corresponding to the right camera lens 510. The captured left image 608, which is captured by the left camera sensor or left camera sensor portion, includes an image capture portion 612 corresponding to the left camera lens 512. Right image capture portion 610, corresponding to lens 510, includes an unobstructed image portion right (UIPR) 614 and an obstructed portion right (OPR) 616. Left image capture portion 612, corresponding to lens 512, includes an unobstructed image portion left (UIPL) 618 and an obstructed portion left (OPL) 620. Legend 604 indicates that: CRI=capture right image, CLI=capture left image, OPR=obstructed portion right, ORL=obstructed portion left, UIPR=unobstructed image portion right, and UIPL=unobstructed image portion left.

Figure 7:
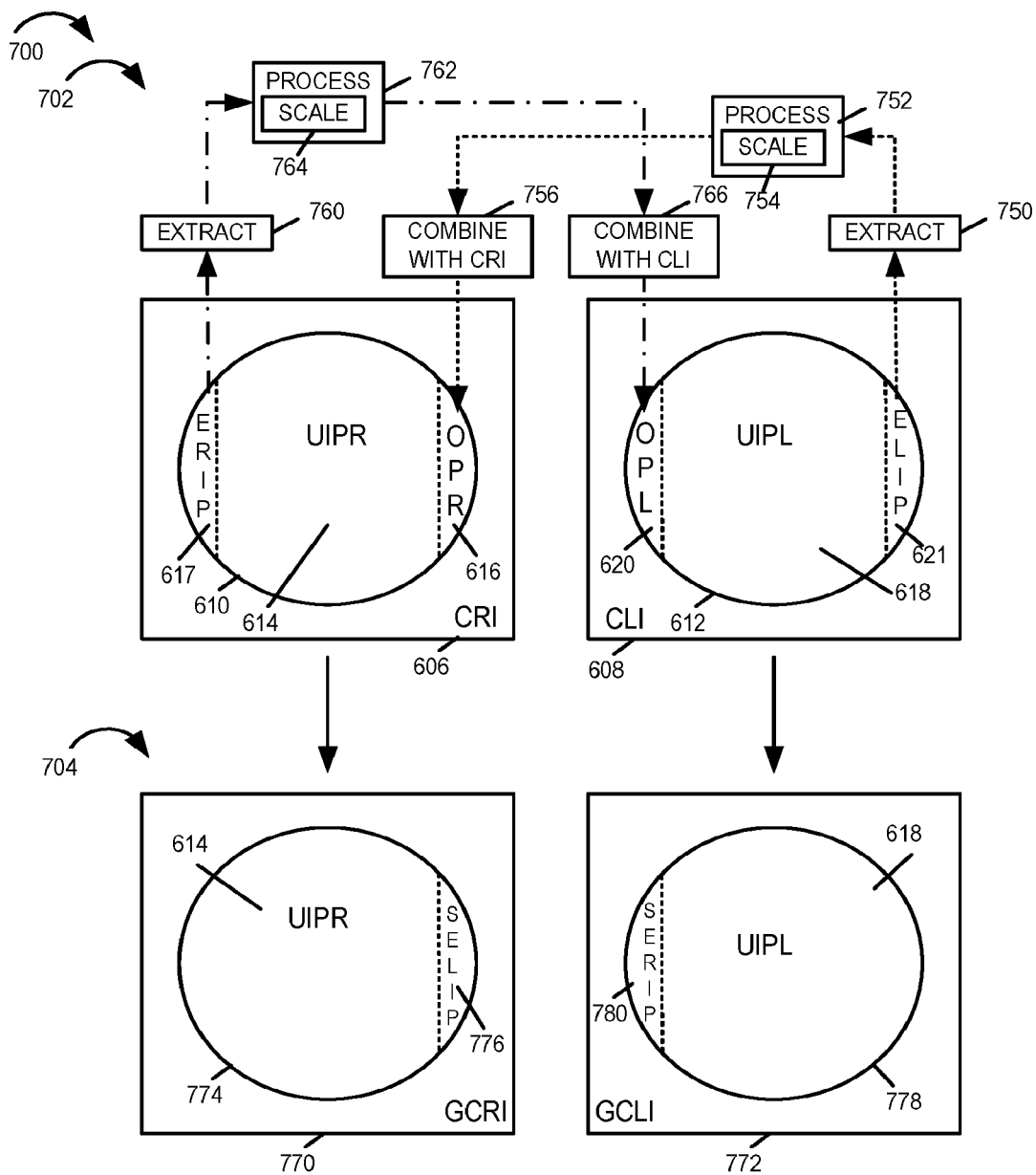
FIG. 7 illustrates exemplary captured images including obstructed image portions, exemplary extracted image portions, exemplary processed images portions and exemplary generated composite images including scaled extracted image portions in accordance with an exemplary embodiment.

FIG. 7 is a drawing 700 which illustrates an exemplary captured image pair and exemplary image processing 702, an exemplary generated composite image pair 704, and a corresponding legend 706 in accordance with an exemplary embodiment. In drawing section 702, the exemplary captured image pair 602, including captured right image 606 and captured left image 608 are shown, as well as exemplary processing.

Captured right image 606 includes image portion 610 corresponding to right camera lens 510. Image portion 610 includes an unobstructed portion 614 and an obstructed portion right (OPR) 616. The unobstructed portion 614 includes an extracted right image portion (ERIP) 617. Extraction component 760 extracts ERIP 617 from the CRI 606. Processing component 762, including a scaling component 764, processes ERIP 617, said processing including scaling, and generates a scaled extracted right image portion (SERIP) 780. Combining component 766 combines the generated SERIP 780 with the captured left image 608, e.g., replacing the obstructed portion left (OPL) 620 with SERIP 780.

Captured left image 608 includes image portion 612 corresponding to left camera lens 512. Image portion 612 includes an unobstructed portion 618 and an obstructed portion left (OPL) 620. The unobstructed portion 618 includes an extracted left image portion (ELIP) 621. Extraction component 750 extracts ELIP 621 from the CLI 608. Processing component 752, including a scaling component 754, processes ELIP 621, said processing including scaling, and generates a scaled extracted left image portion (SELIP) 776. Combining component 756 combines the generated SELIP 776 with the captured right image 606, e.g., replacing the obstructed portion right (OPR) 616 with SELIP 776.

Exemplary generated composite image pair 704 includes a generated composite right image (GCRI) 770 and a generated composite left image (GCLI) 772. GCRI 770 includes an image portion 774 corresponding to right camera lens 510, as if there was no obstruction. Image portion 774 includes unobstructed captured right image portion 614 and scaled extracted left image portion (SELIP) 716. GCLI 772 includes an image portion 778 corresponding to left camera lens 512, as if there was no obstruction. Image portion 778 includes unobstructed captured left image portion 618 and scaled extracted right image portion (SERIP) 780.

Legend 706 indicates that: CRI=capture right image, CLI=capture left image, UIPR=unobstructed image portion right, UIPL=unobstructed image portion left, OPR=obstructed portion right, ORL=obstructed portion left, ERIP=extracted right image portion, ELIP=extracted left image portion, SERIP=scaled extracted right image portion, SELIP=scaled extracted left image portion, GRCI=generated composite right image, and GCRI=generated composite left image.

Figure 8:
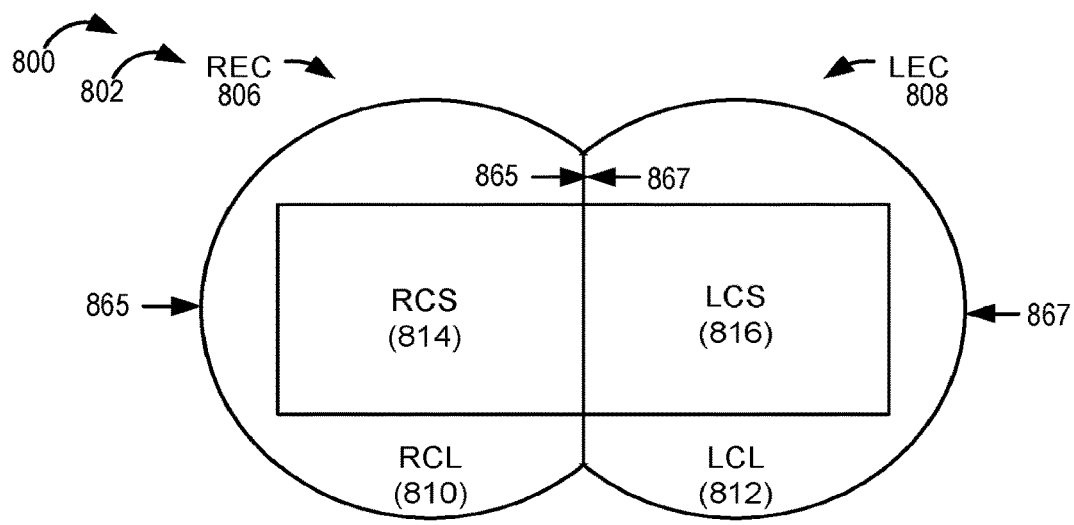
FIG. 8 illustrates an exemplary camera pair, e.g., a stereoscopic camera pair, in which each camera of the camera pair includes a cut lens, e.g., a cut fisheye lens, and a sensor, in accordance with an exemplary embodiment.

FIG. 8 is a drawing 800 which illustrates an exemplary camera pair 802, e.g., a stereoscopic camera pair, in which each camera of the camera pair includes a cut lens, e.g., a cut fisheye lens, and a sensor, and a corresponding legend 804, in accordance with an exemplary embodiment. In some embodiments, the exemplary camera pair 802 is one of the camera pairs 202, 206, 212 of capture system 102 of FIG. 2. Exemplary camera pair 802 includes a right eye camera (REC) 806 and a left eye camera (LEC) 808. Right eye camera (REC) 806 includes a right camera lens (RCL) 810, e.g., a fish eye lens which has been cut flat along one side 865, and a right camera sensor (RCS) 814. Left eye camera (LEC) 808 includes a left camera lens (LCL) 812, e.g., a fish eye lens which has been cut flat along one side 867, and a left camera sensor (LCS) 816.

Legend 804 indicates that: REC=right eye camera, LEC=left eye camera, RCS=right camera sensor, LCS=left camera sensor, RCL=right camera lens, LCL=left camera lens.

Figure 9:
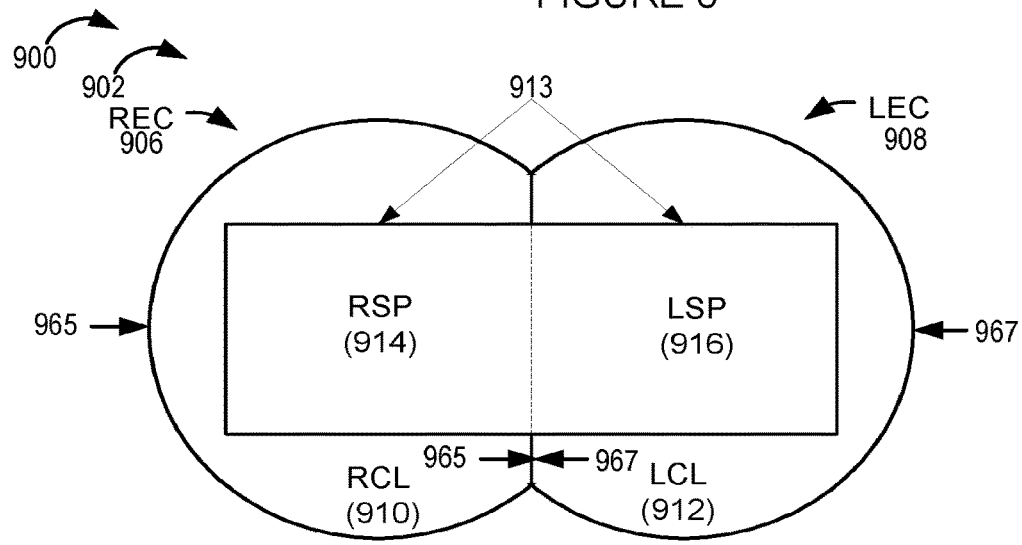
FIG. 9 illustrates an exemplary camera pair, e.g., a stereoscopic camera pair, in which each camera of the camera pair includes a cut lens, e.g., a cut fisheye lens, and the camera pair shares a sensor, in accordance with an exemplary embodiment.

FIG. 9 is a drawing 900 which illustrates an exemplary camera pair 902, e.g., a stereoscopic camera pair, in which each camera of the camera pair includes a cut lens, e.g., a cut fisheye lens, and the camera pair 902 shares a sensor, and further illustrates legend 904 in accordance with an exemplary embodiment. In some embodiments, the exemplary camera pair 902 is one of the camera pairs 202, 206, 212 of capture system 102 of FIG. 2. Exemplary camera pair 902 includes a right eye camera (REC) 906 and a left eye camera (LEC) 908. Right eye camera (REC) 906 includes a right camera lens (RCL) 910, e.g., a fish eye lens which has been cut flat along one side 965, and a right sensor portion (RSP) 914. Left eye camera (LEC) 908 includes a left camera lens (LCL) 912, e.g., a fish eye lens which has been cut flat along one side 967, and a left sensor portion (LSP) 916. Camera sensor 913 includes RSP 914 and LSP 916.

Legend 904 indicates that: REC=right eye camera, LEC=left eye camera, RSP=right sensor portion, LSP=left sensor portion, RCL=right camera lens, LCL=left camera lens.

Figure 10:
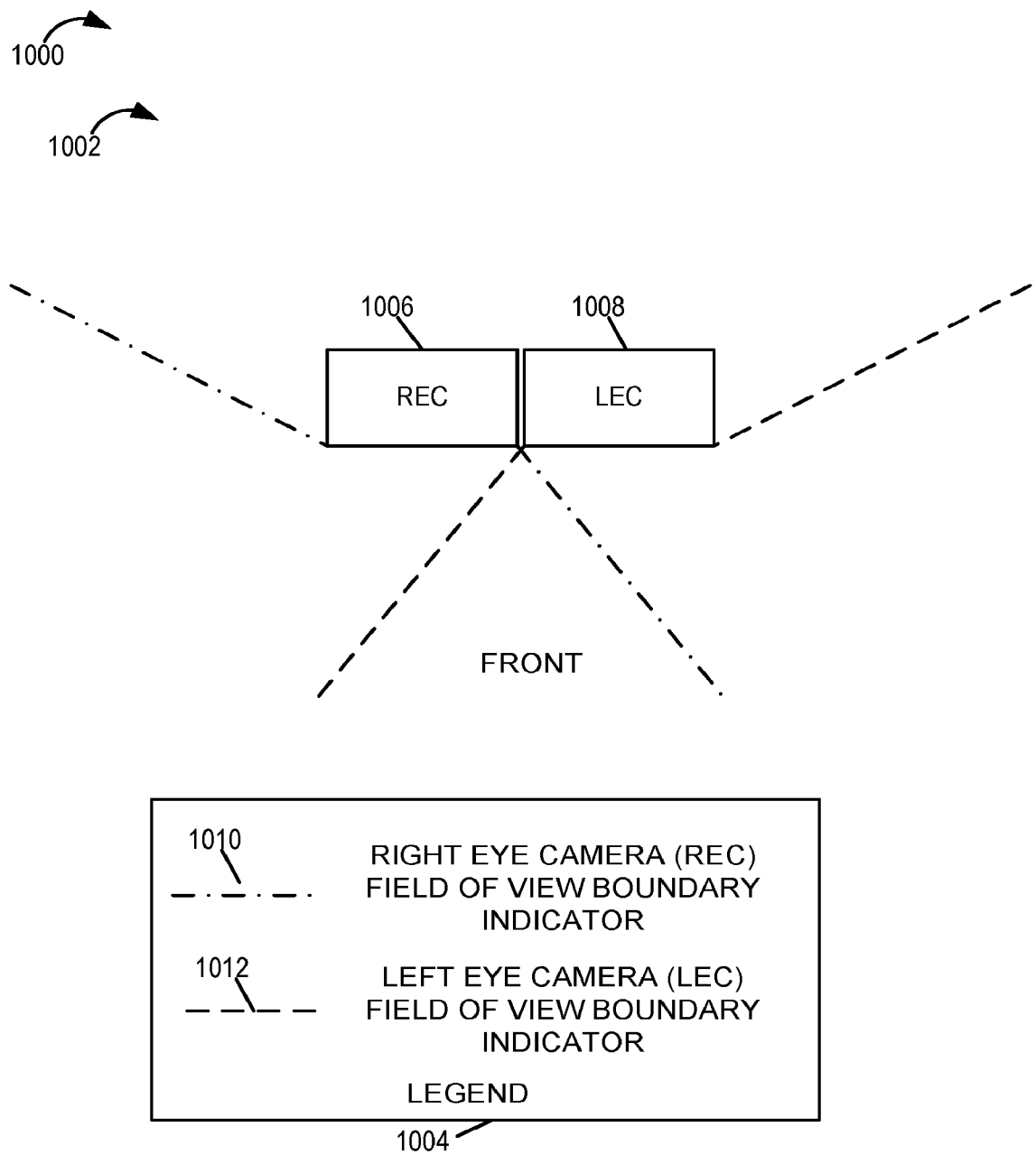
FIG. 10 illustrates and exemplary camera pair, e.g., a stereoscopic camera pair, and illustrates field of view boundaries for each camera, in accordance with an exemplary embodiment.

FIG. 10 is a drawing 1000 which illustrates and exemplary camera pair 1002, e.g., a stereoscopic camera pair, including right eye camera (REC) 1006 and left eye camera (LEC) 1008, and illustrates field of view boundaries for each camera (1006, 1008), in accordance with an exemplary embodiment. In some embodiments, the exemplary camera pair 1002 is one of the camera pairs 202, 206, 212 of capture system 102 of FIG. 2. Legend 1004 indicates that dot/dashed lines 1010 represent right eye camera (REC) field of view boundary indicators, and that dashed lines 1012 represent left eye camera (LEC) field of view boundary indicators.

Figure 11:
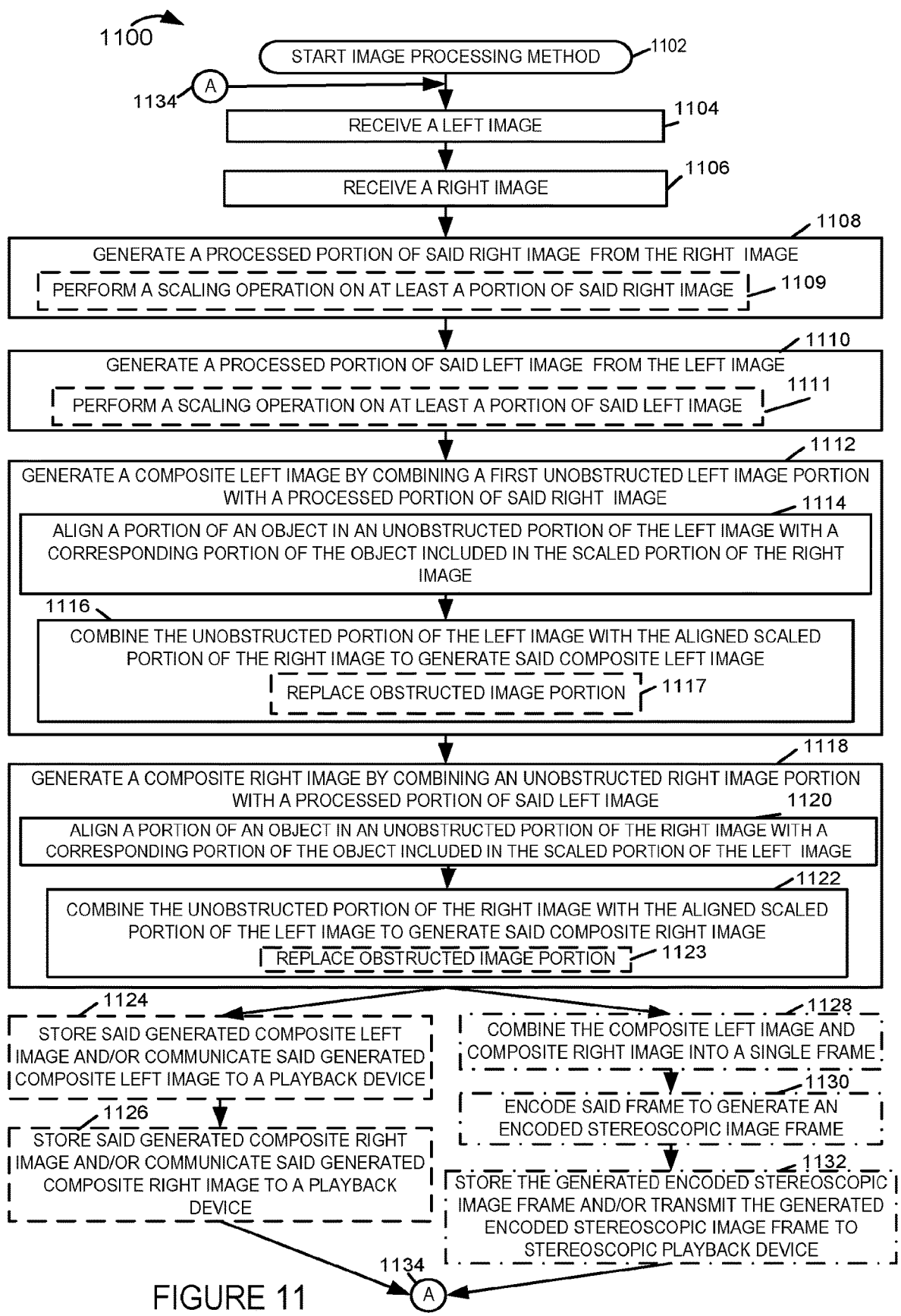
FIG. 11 is a flowchart of an exemplary image processing method in accordance with an exemplary embodiment.

FIG. 11 is a flowchart 1100 of an exemplary image processing method in accordance with an exemplary embodiment. The method of flowchart 1100 may be implemented by an image processing and content delivery system, e.g. image processing and content delivery system 104 of FIG. 1 or FIG. 2 or image processing and content delivery system 300 of FIG. 3. In some embodiments, the method of flowchart 1100 is performed by device 112 of system 104. In some embodiments, the method of flowchart 1100 is performed in an image capture system, e.g., in image processor 207 of stereoscopic image captures system 102 of FIG. 2. The flowchart 1100 will be described for an exemplary embodiment in which the method is performed by an image processing and content delivery system.

Operation starts in step 1102 in which the image processing and content delivery system is powered on and initialized. Operation proceeds from step 1102 to step 1104.

In step 1104 the system receives a left image, e.g., a left image captured by a left side camera of a camera pair, said left image including a first unobstructed image portion. In some embodiments, the left image is an image that was captured by a left side camera of a stereoscopic camera pair. In some embodiments, the first unobstructed image portion is unscaled. In some embodiments, the first unobstructed image portion is an outside left portion of said left image, and the left image further includes an obstructed portion, said obstructed portion being a right inside portion of the left image which is obstructed by a camera lens of a right side camera. Operation proceeds from step 1104 to step 1106.

In step 1106 the system receives a right image from a right side camera of the camera pair, e.g., a right image including a second unobstructed image portion. In some embodiments, the right image is an image that was captured by a right side camera of the stereoscopic camera pair. In some embodiments, the second unobstructed image portion in unscaled. In some embodiments, the second unobstructed image portion is an outside right portion of said right image, and the right image further includes an obstructed portion, said obstructed portion being a left inside portion of the right image which is obstructed by a camera lens of a left side camera.

In some embodiments, the left side camera and the right side camera are cameras of a stereoscopic camera pair, and the left side camera is closer in proximity to the right side camera than the left and right side cameras are to any other cameras, e.g. in the image capture system. In some such embodiments, any other camera in the system may include cameras in other stereoscopic camera pairs and/or mono cameras.

In some embodiments, the left side camera and right side camera of the stereoscopic pair have parallel optical axis, e.g., the optical axis do not diverge or converge and the two cameras point straight out. In some embodiments, the lens of the left side camera is a first fish eye lens and the lens of the right side camera is a second fish eye lens. In some such embodiments, the first fish eye lens obstructs the left side of the right side camera's field of view, and the second fish eye lens obstructs the right side of the left side camera's field of view.

Operation proceeds from step 1106 to step 1108. In step 1108 the system generates a processed portion of said right image from the right image. Step 1108 includes step 1109 in which the system performs a scaling operation on at least a portion of the right image. In some embodiments, the scaling operation includes scaling to reduce the size of one or more objects in said portion of the right image. Operation proceeds from step 1108 to step 1110.

In step 1110 the system generates a processed portion of left right image from the left image. Step 1110 includes step 1111 in which the system performs a scaling operation on at least a portion of the left image. In some embodiments, the scaling operation of step 1111 includes scaling to reduce the size of one or more objects in said portion of the left image. Operation proceeds from step 1110 to step 1112.

In step 1112 the system generates a composite left image by combining a first unobstructed left image portion with a processed portion of the right image. In some embodiments, the composite left image includes image content corresponding to a field of view greater than 180 degrees. Step 1112 includes steps 1114 and 1116. In step 1114 the system aligns a portion of an object in an unobstructed portion of the left image with a corresponding portion of the object included in the scaled portion of the right image. In step 1116 the system combines the unobstructed portion of the left image with the aligned scaled portion of the right image to generate said composite left image. In some embodiments, step 1116 includes step 1117 in which the system replaces an obstructed image portion of the left image with the processed image portion of the right image. Operation proceeds from step 1112 to step 1118.

In step 1118 the system generates a composite right image by combining an unobstructed right image portion with a processed portion of the left image. In some embodiments, the unobstructed right image portion, e.g., a second unobstructed image portion, is an outside portion of said right image which was not obstructed by the camera lens of the left side camera. Step 1118 includes steps 1120 and 1122. In step 1120 the system aligns a portion of an object in an unobstructed portion of the right image with a corresponding portion of the object included in the scaled portion of the left image. In step 1122 the system combines the unobstructed portion of the right image with the aligned scaled portion of the left image to generate said composite right image. In some embodiments, step 1122 includes step 1123 in which the system replaces an obstructed image portion of the right image with the processed image portion of the left image. Operation proceeds from step 1118 to step 1124 or step 1128.

In step 1124 the system stores the generated composite left image and/or communicates the generated composite left image to a playback device. Operation proceeds from step 1124 to step 1126. In step 1126 the system stores the generated composite right image and/or communicates the generated composite right image to a playback device.

In step 1128 the system combines the composite left image and the composite right image into a single frame. Operation proceeds from step 1128 to step 1130. In step 1130 the system encodes the frame to generate an encoded stereoscopic image frame. Operation proceeds from step 1130 to step 1132. In step 1132 the system stores the generated encoded stereoscopic image frame and/or transmits the generated encoded stereoscopic image frame to a stereoscopic playback device.

Operation proceeds from step 1126 or step 1132, via connecting node A 1134 to step 1104, to receive a left image captured by the left side camera, e.g., corresponding to another, e.g., subsequent, image capture time period.

Figure 12:
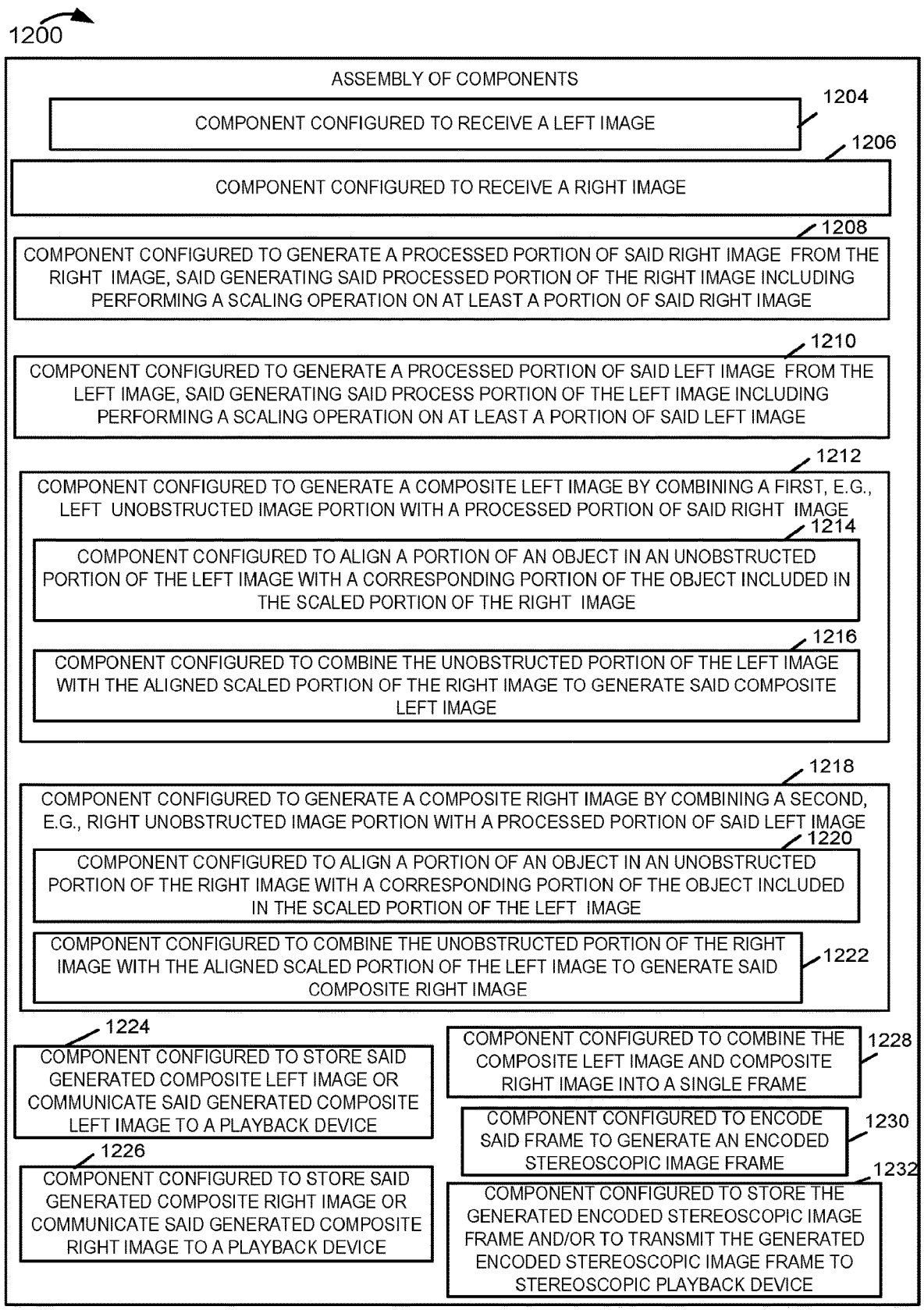
FIG. 12 is a drawing of an assembly of components which may be included in a image processing device or system in accordance with an exemplary embodiment.

FIG. 12 is a drawing of an assembly of components 1200 which may be included in an image processing device or system in accordance with an exemplary embodiment. In some embodiments, assembly of components 1200 are included in one or more of: stereoscopic image capture system 102, image processor 207, memory 213, image processing and content delivery system 104, network head-end image processing and calibration encoding device 112, processor 240, memory 250, assembly of hardware components 285, memory 250, assembly of software components 283, image processing and content delivery system 300, assembly of hardware components 307, processor 308, memory 312, and assembly of software components 353.

Assembly of components 1200 includes a component 1204 configured to receive a left image, e.g., a left image captured by a left side camera of a camera pair, said left image including a first unobstructed image portion, a component 1206 configured to receive a right image, e.g., a right image captured by a right side camera of the camera pair, said right image including a second unobstructed image portion, a component 1208 configured to generate a processed portion of said right image, said generating said processed portion of said right image including performing a scaling operation on at least a portion of said right image, and a component 1210 configured to generate a processed portion of said left image, said generating said processed portion of said left image including performing a scaling operation on at least a portion of said left image. Assembly of components 1200 further includes a component 1212 configured to generate a composite left image by combining a first, e.g., a left, unobstructed image portion, with a processed portion of the right image, and a component 1218 configured to generate a composite right image by combining a second, e.g., a right, unobstructed image portion, with a processed portion of the left image. Component 1212 includes a component 1214 configured to align a portion of an object in an unobstructed portion of the left image with a corresponding portion of the object including in the scaled portion of the right image, and a component 1216 configured to combine the unobstructed portion of the left image with the aligned scaled portion of the right image to generate said composite left image. Component 1218 includes a component 1220 configured to align a portion of an object in an unobstructed portion of the right image with a corresponding portion of the object including in the scaled portion of the left image, and a component 1222 configured to combine the unobstructed portion of the right image with the aligned scaled portion of the left image to generate said composite right image.

Assembly of components 1200 further includes a component 1224 configured to store said generated composite left image or communicate said generated composite left image to a playback device, and a component 1226 configured to store said generated composite right image or communicate said generated composite right image to a playback device. Assembly of components 1200 further includes a component 1228 configured to combine the composite left image and the composite right image into a single frame, a component 1230 configured to encode said frame to generate an encoded stereoscopic image frame, and a component 1232 configured to store the generated stereoscopic image frame and/or transmit the generated stereoscopic image frame to a stereoscopic playback device.

Figure 13:
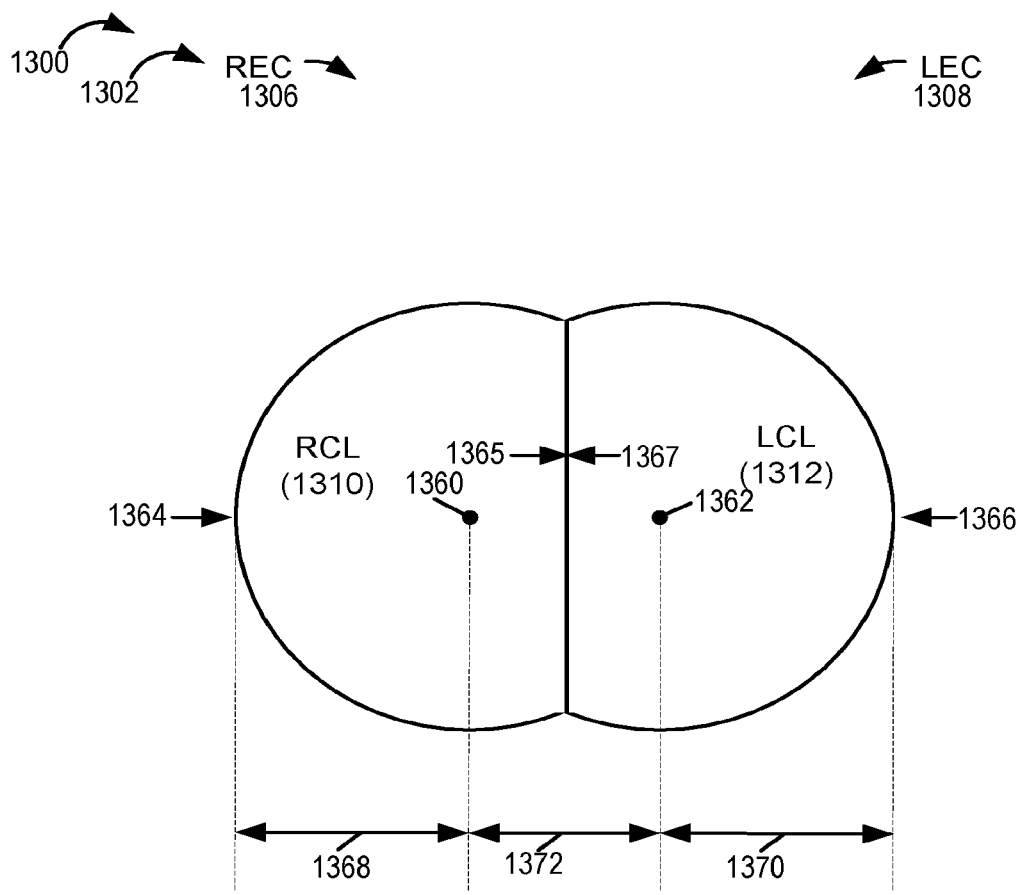
FIG. 13 illustrates an exemplary camera pair, e.g., a stereoscopic camera pair, in which each camera of the camera pair includes a cut lens, e.g., a cut fisheye lens with a flat side, and further illustrates a distance between the optical axis of the lenses and the distance from the edge of a lens to an optical axis of the lens, in accordance with an exemplary embodiment.

FIG. 13 is a drawing 1300 which illustrates an exemplary camera pair 1302, e.g., a stereoscopic camera pair, in which each camera of the camera pair includes a cut lens, e.g., a cut fisheye lens, and a sensor, and a corresponding legend 1304, in accordance with an exemplary embodiment. In some embodiments, the exemplary camera pair 1302 is one of the camera pairs 202, 206, 212 of capture system 102 of FIG. 2. Exemplary camera pair 1302 includes a right eye camera (REC) 1306 and a left eye camera (LEC) 1308. Right eye camera (REC) 1306 includes a right camera lens (RCL) 1310, e.g., a fish eye lens which has been cut flat along one side 1365, and a right camera sensor (RCS). Left eye camera (LEC) 1308 includes a left camera lens (LCL) 1312, e.g., a fish eye lens which has been cut flat along one side 1367, and a left camera sensor (LCS).

Legend 1304 indicates that: REC=right eye camera, LEC=left eye camera, RCL=right camera lens, and LCL=left camera lens.

Dot 1360 represents the optical axis of the right camera lens 1310, e.g., a fisheye lens which has been cut flat along one side. Dot 1362 represents the optical axis of the left camera lens 1312, e.g., a fisheye lens which has been cut flat along one side. In the example of FIG. 13, the distance 1370 from the optical axis 1362 of the first, e.g., left, fisheye lens 1312 to the outermost edge 1366 of the first, e.g., left, fisheye lens 1312 is greater than the distance 1372 between the optical axis 1362 of the first, e.g., left, fisheye lens 1312 and the optical axis 1360 of the second, e.g., right, fisheye lens 1312. In the example of FIG. 13, the distance 1368 from the optical axis 1360 of the second, e.g., right, fisheye lens 1310 to the outermost edge 1364 of the second, e.g., right, fisheye lens 1310 is greater than the distance 1372 between the optical axis 1362 of the first, e.g., left, fisheye lens 1312 and the optical axis 1360 of the second, e.g., right fisheye lens 1310. In some such embodiments, distance 1368 is the same as distance 1370.

Figure 14:
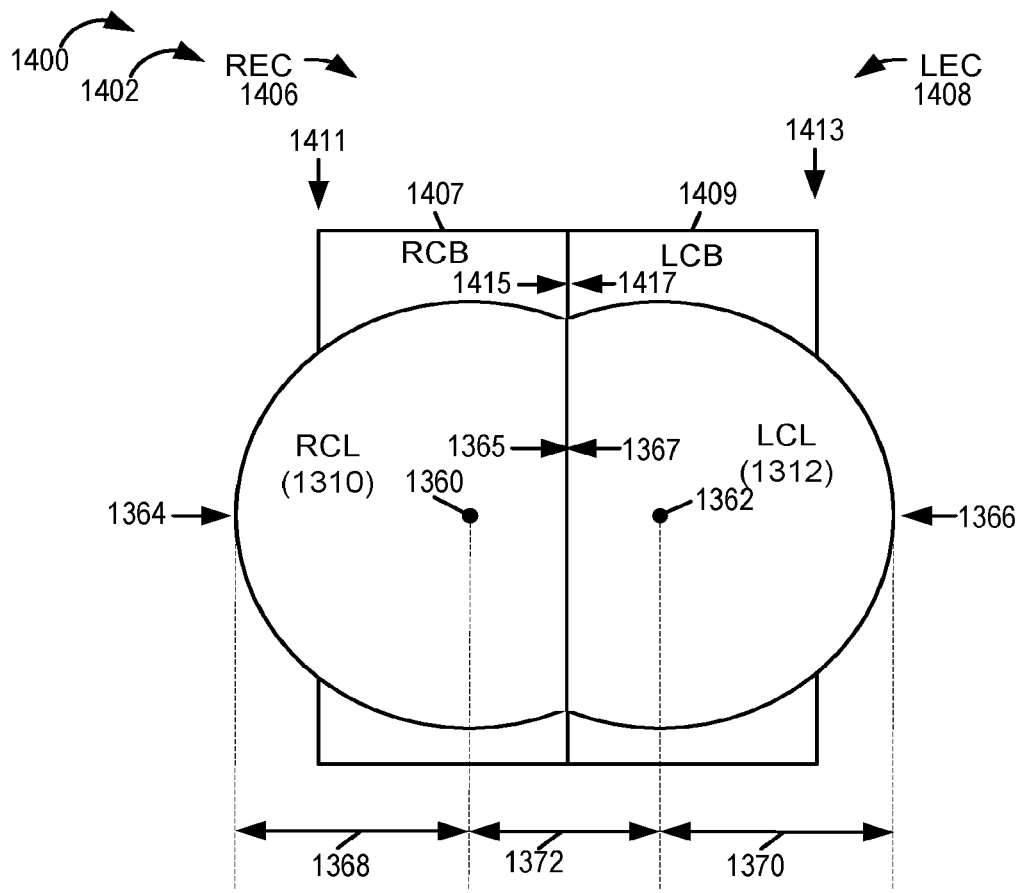
FIG. 14 illustrates an exemplary camera pair, e.g., a stereoscopic camera pair, in which each camera of the camera pair includes a cut lens, e.g., a cut fisheye lens with a flat side, and further illustrates that, for each camera, an outside edge of the cut lens extends beyond the edge of the camera body in accordance with an exemplary embodiment.

FIG. 14 is a drawing 1400 which illustrates an exemplary camera pair 1402, e.g., a stereoscopic camera pair, in which each camera of the camera pair includes a cut lens, e.g., a cut fisheye lens, and a sensor, and a corresponding legend 1404, in accordance with an exemplary embodiment. In some embodiments, the exemplary camera pair 1402 is one of the camera pairs 202, 206, 212 of capture system 102 of FIG. 2. Exemplary camera pair 1402 includes a right eye camera (REC) 1406 and a left eye camera (LEC) 1408. Right eye camera (REC) 1406 includes a right camera lens (RCL) 1310, e.g., a fish eye lens which has been cut flat along one side 1365, and a right camera sensor (RCS). Left eye camera (LEC) 1408 includes a left camera lens (LCL) 1312, e.g., a fish eye lens which has been cut flat along one side 1367, and a left camera sensor (LCS).

Legend 1404 indicates that: REC=right eye camera, LEC=left eye camera, RCL=right camera lens, LCL=left camera lens, RCB=right camera body, and LCB=left camera body.

Dot 1360 represents the optical axis of the right camera lens 1310, e.g., a fisheye lens which has been cut flat along one side. Dot 1362 represents the optical axis of the left camera lens 1312, e.g., a fisheye lens which has been cut flat along one side. In the example of FIG. 14, the distance 1370 from the optical axis 1362 of the first, e.g., left, fisheye lens 1312 and the outermost edge 1366 of the first, e.g., left, fisheye lens 1312 is greater than the distance 1372 between the optical axis 1362 of the first, e.g., left, fisheye lens 1312 and the optical axis 1360 of the second, e.g., right fisheye lens 1310. In the example of FIG. 14, the distance 1368 from the optical axis 1360 of the second, e.g., right, fisheye lens 1310 and the outermost edge 1364 of the second, e.g., right, fisheye lens 1310 is greater than the distance 1372 between the optical axis 1362 of the first, e.g., left, fisheye lens 1312 and the optical axis 1360 of the second, e.g., right fisheye lens 1310. In some such embodiments, distance 1368 is the same as distance 1370.

In the example of FIG. 14, right eye camera 1406 includes a right camera body 1407, and left eye camera 1408 includes a left camera body 1409. Lens 1312 has an edge 1366 which is opposite the flat, e.g., cut, portion 1367 of the lens 1312, and the edge 1366 of lens 1312 extends beyond side 1413 of left camera body 1409 of left eye camera 1408.

Lens 1310 has an edge 1364 which is opposite the flat, e.g., cut, portion 1365 of the lens 1310, and the edge 1364 of lens 1310 extends beyond the side 1411 of right camera body 1407 of right eye camera 1406.

The flat portion 1367 of said first fish eye lens 1312 ends at a side 1417 of the left camera body 1409 of the left camera 1408, and the flat portion 1365 of the second fish eye lens 1310 ends at a side 1415 of the right camera body 1407 of the second camera 1406.

Figure 15:
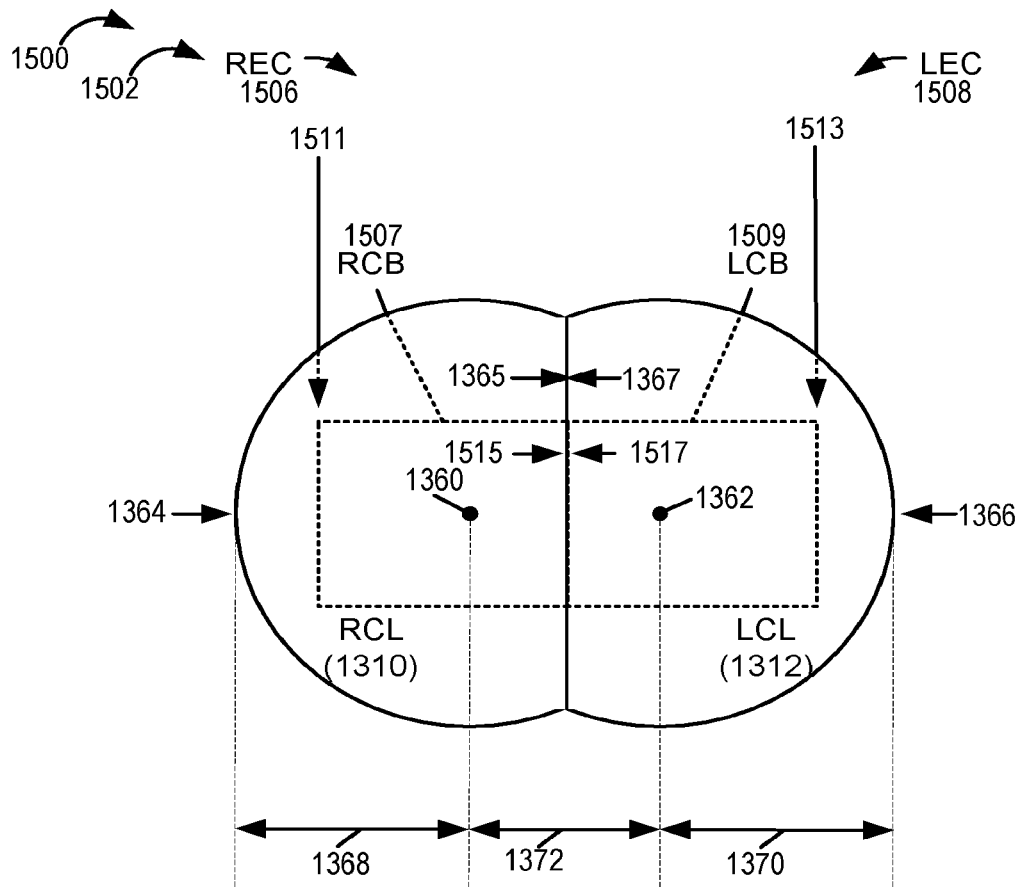
FIG. 15 illustrates another exemplary camera pair, e.g., a stereoscopic camera pair, in which each camera of the camera pair includes a cut lens, e.g., a cut fisheye lens with a flat side, and further illustrates that for each camera, an outside edge of the cut lens extends beyond the edge of the camera body in accordance with an exemplary embodiment.

FIG. 15 is a drawing 1500 which illustrates an exemplary camera pair 1502, e.g., a stereoscopic camera pair, in which each camera of the camera pair includes a cut lens, e.g., a cut fisheye lens, and a sensor, and a corresponding legend 1504, in accordance with an exemplary embodiment. In some embodiments, the exemplary camera pair 1502 is one of the camera pairs 202, 206, 212 of capture system 102 of FIG. 2. Exemplary camera pair 1502 includes a right eye camera (REC) 1506 and a left eye camera (LEC) 1508. Right eye camera (REC) 1506 includes a right camera lens (RCL) 1310, e.g., a fish eye lens which has been cut flat along one side 1365, and a right camera sensor (RCS). Left eye camera (LEC) 1508 includes a left camera lens (LCL) 1312, e.g., a fish eye lens which has been cut flat along one side 1367, and a left camera sensor (LCS).

Legend 1504 indicates that: REC=right eye camera, LEC=left eye camera, RCL=right camera lens, LCL=left camera lens, RCB=right camera body, and LCB=left camera body.

Dot 1360 represents the optical axis of the right camera lens 1310, e.g., a fisheye lens which has been cut flat along one side. Dot 1362 represents the optical axis of the left camera lens 1312, e.g., a fisheye lens which has been cut flat along one side. In the example of FIG. 15, the distance 1370 from the optical axis 1362 of the first, e.g., left, fisheye lens 1312 and the outermost edge 1366 of the first, e.g., left, fisheye lens 1312 is greater than the distance 1372 between the optical axis 1362 of the first, e.g., left, fisheye lens 1312 and the optical axis 1360 of the second, e.g., right fisheye lens 1310. In the example of FIG. 15, the distance 1368 from the optical axis 1360 of the second, e.g., right, fisheye lens 1310 and the outermost edge 1364 of the second, e.g., right, fisheye lens 1310 is greater than the distance 1372 between the optical axis 1362 of the first, e.g., left, fisheye lens 1312 and the optical axis 1360 of the second, e.g., right fisheye lens 1310. In some such embodiments, distance 1368 is the same as distance 1370.

In the example of FIG. 15, right eye camera 1506 includes a right camera body 1507, and left eye camera 1508 includes a left camera body 1509. Lens 1312 has an edge 1366 which is opposite the flat, e.g., cut, portion of the lens 1312, and the edge 1366 of lens 1312 extends beyond side 1513 of left camera body 1509 of left eye camera 1508.

Lens 1310 has an edge 1364 which is opposite the flat, e.g., cut, portion of the lens 1310, and the edge 1364 of lens 1310 extends beyond side 1511 of right camera body 1507 of right eye camera 1506.

The flat portion 1367 or 1667 of said first fish eye lens 1312 ends at a side 1517 of the left camera body 1509 of the left camera 1508 and the flat portion 1367 of the second fish eye lens 1310 ends at a side 1515 of the right camera body 1507 of the second camera 1506.

Figure 16:
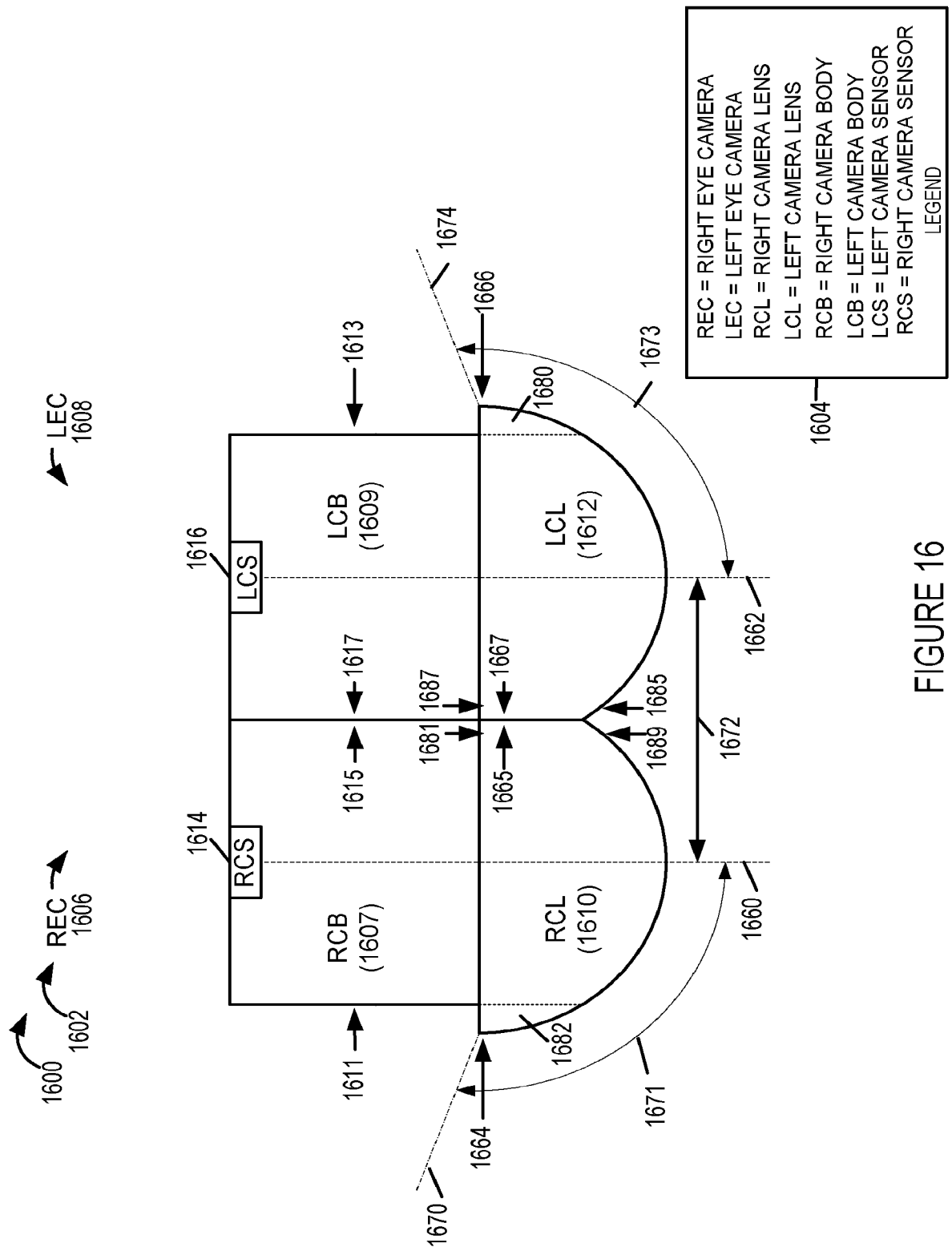
FIG. 16 illustrates yet another exemplary camera pair, e.g., a stereoscopic camera pair, in which each camera of the camera pair includes a cut lens, e.g., a cut fisheye lens with a flat side, and further illustrates that for each camera, an outside edge of the cut lens extends beyond the edge of the camera body in accordance with an exemplary embodiment.

FIG. 16 illustrates a drawing 1600 including a top down view of an exemplary camera pair 1602, e.g., a stereoscopic camera pair, in which each camera of the camera pair includes a cut lens, e.g., a cut fisheye lens with a flat side, and further illustrates that for each camera, an outside edge of the cut lens extends beyond the edge of the camera body in accordance with an exemplary embodiment. In some embodiments, the exemplary camera pair 1602 is one of the camera pairs 202, 206, 212 of capture system 102 of FIG. 2. FIG. 16 further includes a corresponding legend 1604.

Exemplary camera pair 1602 includes a right eye camera (REC) 1606 and a left eye camera (LEC) 1608. Right eye camera (REC) 1606 includes a right camera lens (RCL) 1610, e.g., a fish eye lens which has been cut flat along one side 1665, and a right camera sensor (RCS) 1614. Left eye camera (LEC) 1608 includes a left camera lens (LCL) 1612, e.g., a fish eye lens which has been cut flat along one side 1667, and a left camera sensor (LCS) 1616.

Legend 1604 indicates that: REC=right eye camera, LEC=left eye camera, RCL=right camera lens, LCL=left camera lens, RCB=right camera body, LCB=left camera body, RCS=right camera sensor, and LCS=left camera sensor.

Dashed line 1660 represents the optical axis of the right camera lens 1610, e.g., a fisheye lens which has been cut flat along one side. Dashed line 1662 represents the optical axis of the left camera lens 1612, e.g., a fisheye lens which has been cut flat along one side. Distance 1672 is the spacing between optical axis 1662 and optical axis 1670.

In the example of FIG. 16, right eye camera 1606 includes a right camera body 1607, and left eye camera 1608 includes a left camera body 1609. Right camera body 1607 includes right camera sensor 1614. Left camera body 1609 includes left camera sensor 1616. Lens 1612 has an edge 1666 which is opposite the flat, e.g., cut, portion 1667 of the lens 1612, and the edge 1666 of lens 1612 extends beyond side 1613 of left camera body 1609 of left eye camera 1608.

Lens 1610 has an edge 1664 which is opposite the flat, e.g., cut, portion 1665 of the lens 1610, and the edge 1664 of lens 1610 extends beyond side 1611 of right camera body 1607 of right eye camera 1606.

The flat portion 1667 of left camera lens 1612, e.g., a cut fish eye lens, ends at side 1617 of left camera body 1609 of left eye camera 1608. The flat portion 1665 of right camera lens 1610, e.g., a cut fish eye lens, ends at side 1615 of right camera body 1607 of right eye camera 1606.

The left camera lens 1612, e.g., a cut fish eye lens, directs light entering the edge 1680 of the lens 1612 extending beyond the edge 1613 of the left camera body 1609 of the left eye camera 1608 onto the left camera sensor 1616. The right camera lens 1610, e.g., a cut fish eye lens, directs light entering the edge 1682 of the lens 1610 extending beyond the edge 1611 of the right camera body 1607 of the right eye camera 1606 onto the right camera sensor 1614.

The flat portion 1667 of said first fish eye lens 1612 ends at a side 1617 of the left camera body 1609 of the left camera 1608, and the flat portion 1665 of the second fish eye lens 1610 ends at a side 1615 of the right camera body 1607 of the second camera 1606.

Left camera lens 1612, e.g., a cut fish eye lens, has a left field of view which extends beyond 90 degrees from the optical 1662 of the left lens 1612. Dot-Dash line 1674 represents the edge of the left field of view of the left lens 1612. Angle 1673, between the optical axis 1662 and the left edge 1674 of the field of view of the left lens 1612, is greater than 90 degrees.

Right camera lens 1610, e.g., a cut fish eye lens, has a right field of view which extends beyond 90 degrees from the optical 1660 of the right lens 1610. Dot-Dash line 1670 represents the edge of the right field of view of the right lens 1610. Angle 1671, between the optical axis 1660 and the right edge 1670 of the field of view of the right lens 1610, is greater than 90 degrees.

Figure 17:
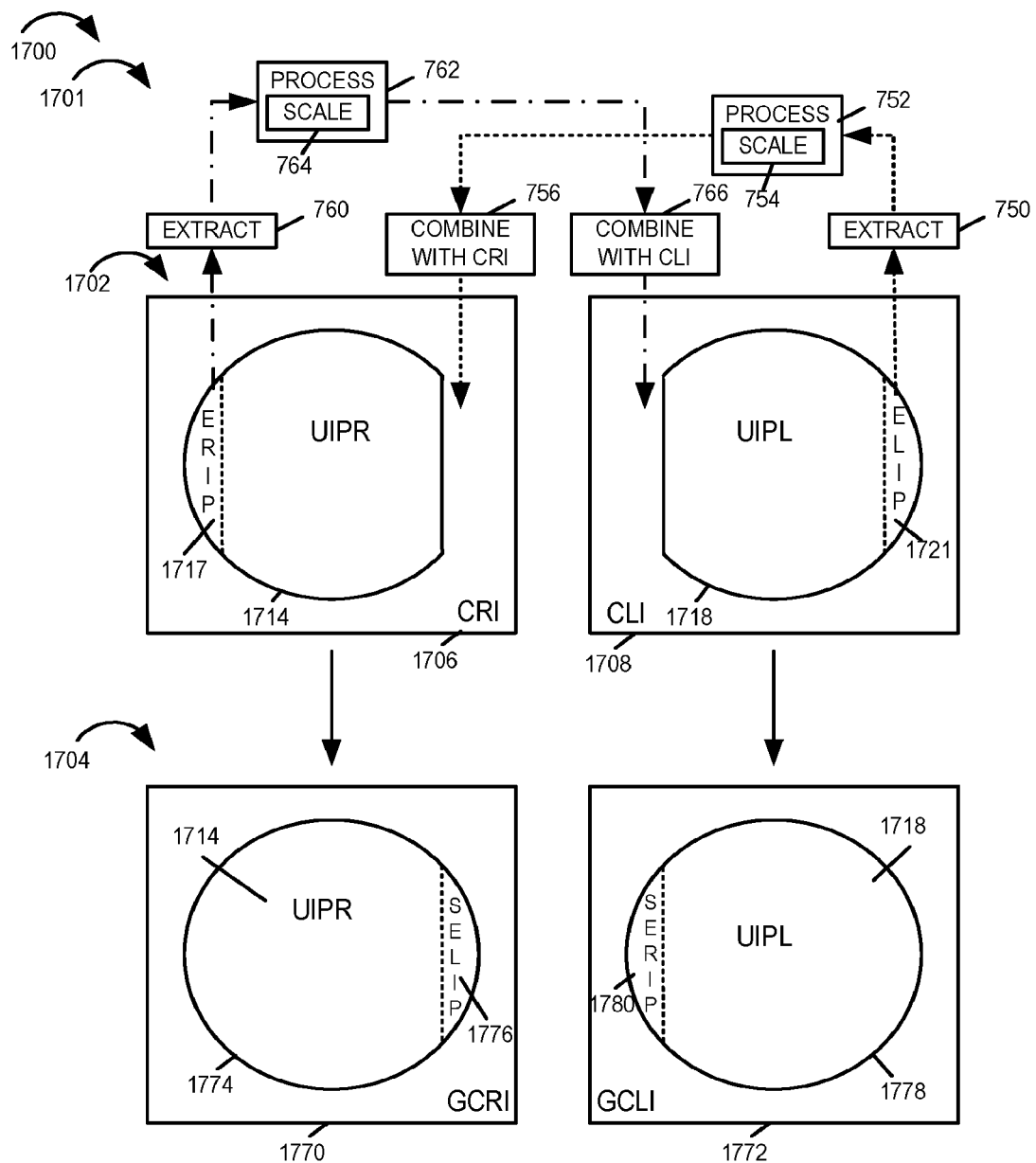
FIG. 17 illustrates exemplary captured images from cameras including cut lenses, e.g., cut fisheye lenses, exemplary extracted image portions, exemplary processed images portions and exemplary generated composite images including scaled extracted image portions in accordance with an exemplary embodiment.

FIG. 17 is a drawing 1700 which illustrates an exemplary captured image pair 1702 from cameras including cut lenses, e.g., cut fisheye lenses, and exemplary image processing 1701, an exemplary generated composite image pair 1704, and a corresponding legend 1705 in accordance with an exemplary embodiment. The exemplary camera pair is, e.g., camera pair 1302, 1402, 1502 or 1602 including cut fisheye lenses (1312, 1310) or (1612, 1610). The exemplary captured image pair 1702, including captured right image (CRI) 1706 and captured left image 1708 are shown, as well as exemplary processing 1701.

Captured right image 1706 includes image portion 1714 corresponding to a right camera lens, which is an unobstructed image portion. The unobstructed image portion 1714 includes an extracted right image portion (ERIP) 1717. Extraction component 760 extracts ERIP 1717 from the CRI 1706. Processing component 762, including a scaling component 764, processes ERIP 1717, said processing including scaling, and generates a scaled extracted right image portion (SERIP) 1780. Combining component 766 combines the generated SERIP 1780 with the captured left image 1708, e.g., attaching SERIP 1780 to unobstructed image portion left 1718.

Captured left image 1708 includes image portion 1718 corresponding to a left camera lens, which is an unobstructed image portion. The unobstructed portion 1718 includes an extracted left image portion (ELIP) 1721. Extraction component 750 extracts ELIP 1721 from the CLI 1708. Processing component 752, including a scaling component 754, processes ELIP 1721, said processing including scaling, and generates a scaled extracted left image portion (SELIP) 1776. Combining component 756 combines the generated SELIP 1776 with the captured right image 1706, e.g., attaching SELIP 1776 to unobstructed image portion right 1714.

Exemplary generated composite image pair 1704 includes a generated composite right image (GCRI) 1770 and a generated composite left image (GCLI) 1772. GCRI 1770 includes an image portion 1774 corresponding to right camera lens, as if the right camera lens was uncut and there was no obstruction. Image portion 1774 includes unobstructed captured right image portion 1714 and scaled extracted left image portion (SELIP) 1776. GCLI 1772 includes an image portion 1778 corresponding to left camera lens, as if the left camera lens was uncut and there was no obstruction. Image portion 1778 includes unobstructed captured left image portion 1718 and scaled extracted right image portion (SERIP) 1780.

Legend 1706 indicates that: CRI=capture right image, CLI=captured left image, ERIP=extracted right image portion, ELIP=extracted left image portion, SERIP=scaled extracted right image portion, SELIP=scaled extracted left image portion, GCRI=generated composite right image, and GCLI=generated composite left image.

Figure 18:
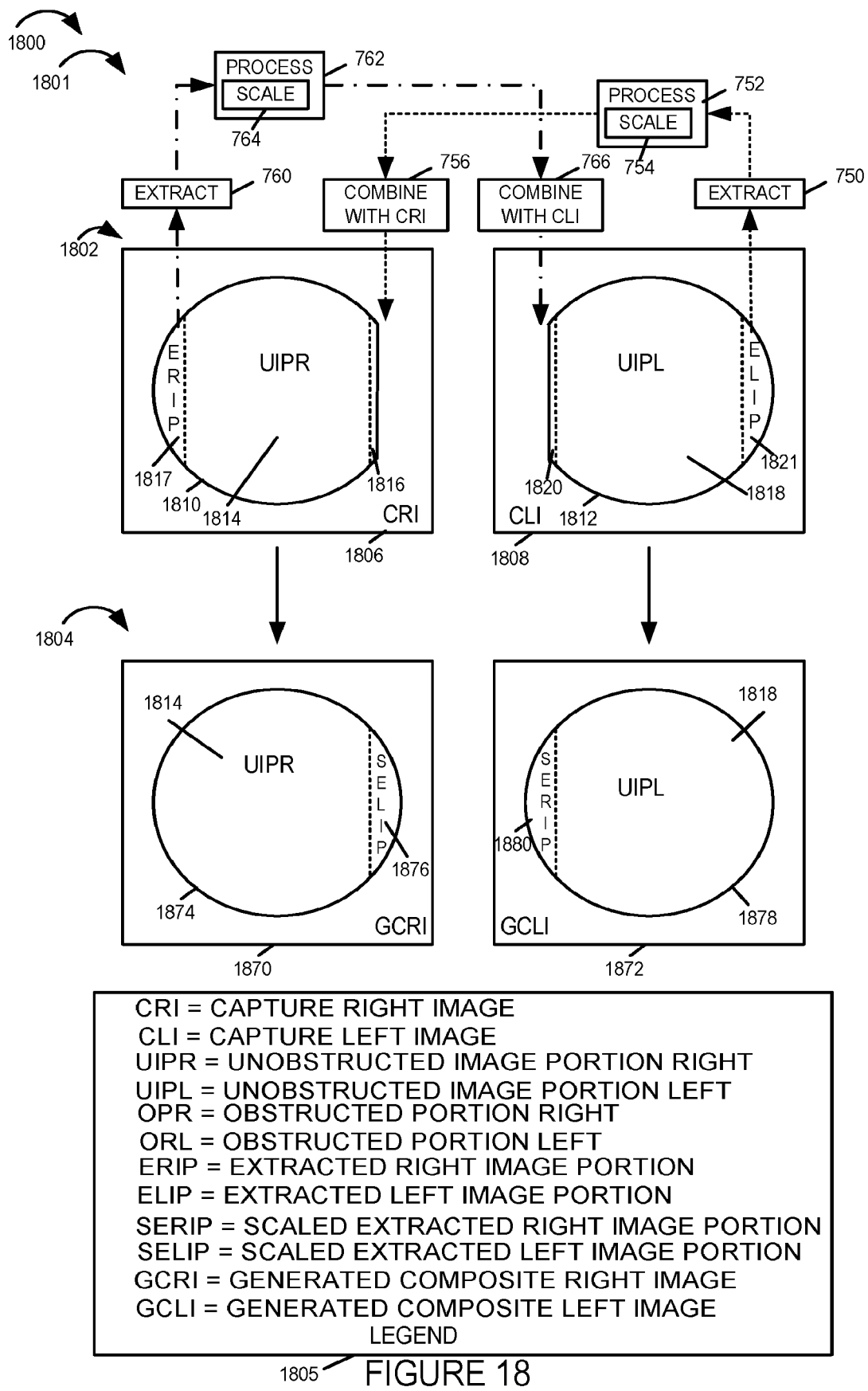
FIG. 18 illustrates exemplary captured images from cameras including cut lenses, e.g., cut fisheye lenses, exemplary extracted image portions, exemplary processed images portions and exemplary generated composite images including scaled extracted image portions in accordance with an exemplary embodiment.

FIG. 18 is a drawing 1800 which illustrates an exemplary captured image pair 1802, exemplary image processing 1801, an exemplary generated composite image pair 1804, and a corresponding legend 1805, in accordance with an exemplary embodiment. In The exemplary captured image pair 1802, including captured right image 1806 and captured left image 1808 are shown, as well as exemplary processing 1801.

Captured right image 1806 includes image portion 1810 corresponding to right camera lens, which is a cut lens, e.g. a cut fisheye lens with a flat side. Image portion 1810 includes an unobstructed portion 1814 and an obstructed portion right (OPR) 1816. The unobstructed portion 1814 includes an extracted right image portion (ERIP) 1817. Extraction component 760 extracts ERIP 1817 from the CRI

1806. Processing component 762, including a scaling component 764, processes ERIP 1817, said processing including scaling, and generates a scaled extracted right image portion (SERIP) 1880. Combining component 766 combines the generated SERIP 1880 with the captured left image 1808, e.g., replacing the obstructed portion left (OPL) 1820 with SERIP 1880.

Captured left image 1808 includes image portion 1812 corresponding to left camera lens, which is a cut lens, e.g., a cut fisheye lens with a flat side. Image portion 1812 includes an unobstructed portion 1818 and an obstructed portion left (OPL) 1820. The unobstructed portion 1818 includes an extracted left image portion (ELIP) 1821. Extraction component 750 extracts ELIP 1821 from the CLI 1808. Processing component 752, including a scaling component 754, processes ELIP 1821, said processing including scaling, and generates a scaled extracted left image portion (SELIP) 1876. Combining component 756 combines the generated SELIP 1876 with the captured right image 1806, e.g., replacing the obstructed portion right (OPR) 1816 with SELIP 1876.

Exemplary generated composite image pair 1804 includes a generated composite right image (GCRI) 1870 and a generated composite left image (GCLI) 1872. GCRI 1870 includes an image portion 1874 corresponding to right camera lens, as if there was no obstruction and as if the lens was uncut. Image portion 1874 includes unobstructed captured right image portion 1814 and scaled extracted left image portion (SELIP) 1816. GCLI 1872 includes an image portion 1878 corresponding to left camera lens, as if there was no obstruction and as if the lens was uncut. Image portion 1878 includes unobstructed captured left image portion 1818 and scaled extracted right image portion (SERIP) 1880.

Legend 1805 indicates that: CRI=capture right image, CLI=captured left image, UIPR=unobstructed image portion right, UIPL=unobstructed image portion left, OPR=obstructed portion right, ORL=obstructed portion left, ERIP=extracted right image portion, ELIP=extracted left image portion, SERIP=scaled extracted right image portion, SELIP=scaled extracted left image portion, GCRI=generated composite right image, and GCLI=generated composite left image.

Figure 19:
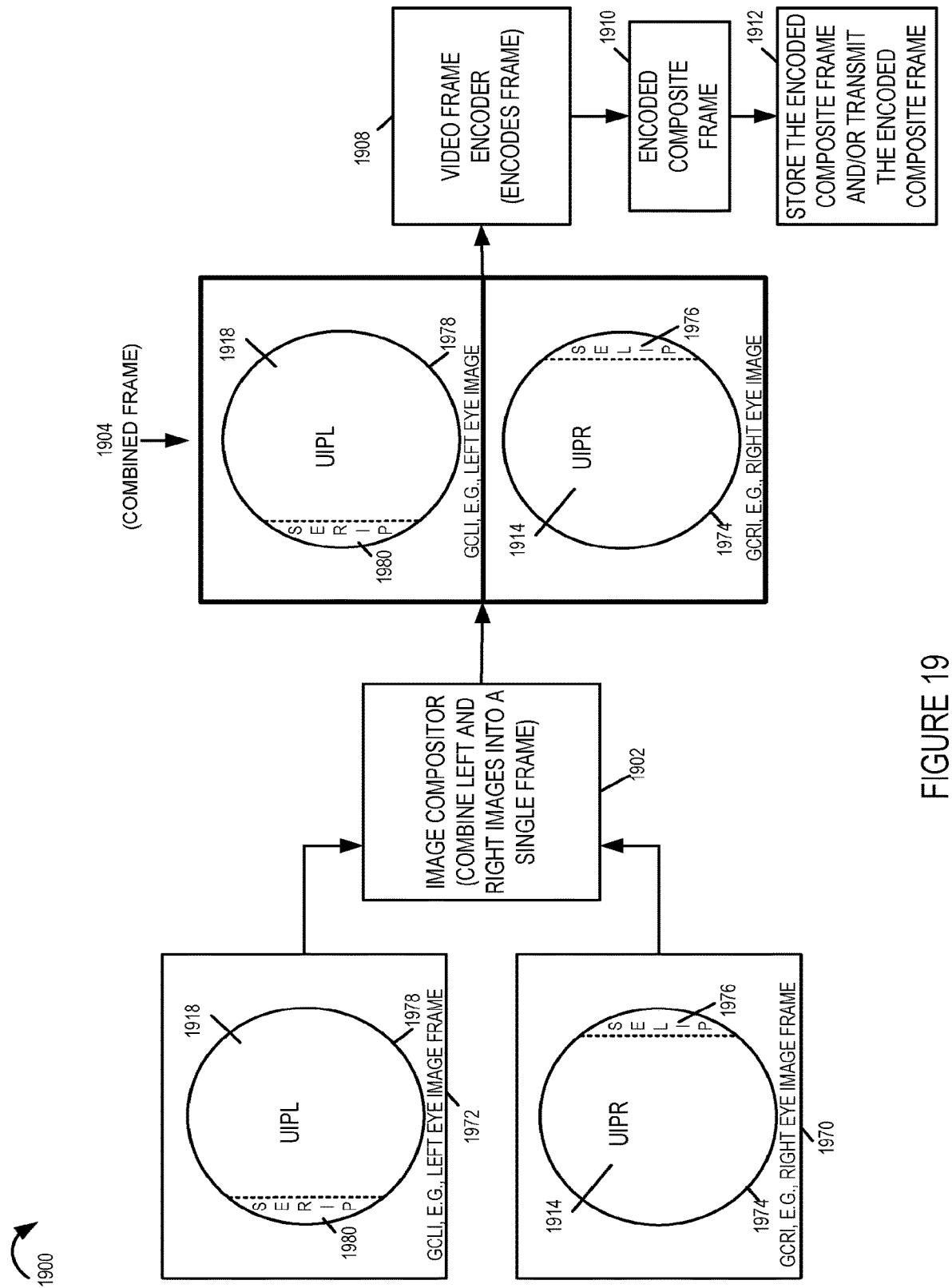
FIG. 19 is a drawing illustrating combining of a generated composite left image and a generated composite right image into a combined frame, encoding of the combined frame to generate an encoded composite frame, and storing and/or transmitting the encoded composite frame, in accordance with an exemplary embodiment.

FIG. 19 is a drawing 1900 illustrating combining of a generated composite left image 1972 and a generated composite right image 1970 into a combined frame 1904, encoding of the combined frame 1904 to generate an encoded composite frame 1910, and storing and/or transmitting the encoded composite frame 1910, in accordance with an exemplary embodiment.

The generated composite left image 1972, e.g., a left eye image frame, includes an image area 1978 corresponding to a left camera lens, as if the left camera lens was unobstructed and uncut. Image area 1978 includes an unobstructed image portion left (UIPL) 1918 which is sourced from a left camera in a camera pair, e.g., a stereoscopic camera pair. Image area 1978 further includes a scaled extracted right image portion (SERIP) 1980, which was generated from a portion of an image captured by the right camera in the camera pair.

The generated composite right image 1970, e.g., a right eye image frame, includes an image area 1974 corresponding to a right camera lens, as if the right camera lens was unobstructed and uncut. Image area 1974 includes an unobstructed image portion right (UIPR) 1914 which is sourced from the right camera in the camera pair, e.g., the stereoscopic camera pair. Image area 1974 further includes a scaled extracted left image portion (SELIP) 1976, which was generated from a portion of an image captured by the left camera in the camera pair.

In one exemplary embodiment, generated composite left image (GCLI) 1972 of FIG. 19 is GCLI 772 of FIG. 7; image area 1978 of FIG. 19 is image area 778 of FIG. 7; unobstructed image portion left (UIPL) 1918 of FIG. 19 is UIPL 618 of FIG. 7; scaled extracted right image portion (SERIP) 1980 of FIG. 19 is SERIP 780 of FIG. 7; generated composite right image (GCRI) 1970 of FIG. 19 is GCRI 770 of FIG. 7; image area 1974 of FIG. 19 is image area 774 of FIG. 7; unobstructed image portion left (UIPR) 1914 of FIG. 19 is UIPR 614 of FIG. 7; and scaled extracted left image portion (SELIP) 1976 of FIG. 19 is SELIP 776 of FIG. 7.

In another exemplary embodiment, generated composite left image (GCLI) 1972 of FIG. 19 is GCLI 1772 of FIG. 17; image area 1978 of FIG. 19 is image area 1778 of FIG. 17; unobstructed image portion left (UIPL) 1918 of FIG. 19 is UIPL 1718 of FIG. 17; scaled extracted right image portion (SERIP) 1980 of FIG. 19 is SERIP 1780 of FIG. 17; generated composite right image (GCRI) 1970 of FIG. 19 is GCRI 1770 of FIG. 17; image area 1974 of FIG. 19 is image area 1774 of FIG. 17; unobstructed image portion left (UIPR) 1914 of FIG. 19 is UIPR 1714 of FIG. 17; and scaled extracted left image portion (SELIP) 1976 of FIG. 19 is SELIP 1776 of FIG. 17.

In yet another exemplary embodiment, generated composite left image (GCLI) 1972 of FIG. 19 is GCLI 1872 of FIG. 18; image area 1978 of FIG. 19 is image area 1878 of FIG. 18; unobstructed image portion left (UIPL) 1918 of FIG. 19 is UIPL 1818 of FIG. 18; scaled extracted right image portion (SERIP) 1980 of FIG. 19 is SERIP 1880 of FIG. 18; generated composite right image (GCRI) 1970 of FIG. 19 is GCRI 1870 of FIG. 18; image area 1974 of FIG. 19 is image area 1874 of FIG. 18; unobstructed image portion left (UIPR) 1914 of FIG. 19 is UIPR 1814 of FIG. 18; and scaled extracted left image portion (SELIP) 1976 of FIG. 19 is SELIP 1876 of FIG. 17.

The generated composite left eye image 1972 and the generated composite right eye image 1970 are input to image compositor 1902, which combines the left and right images into a single frame, e.g., a stereoscopic image frame. The compositor in the example shows the GCLI being positioned on top of the GCRI in the combined frame but other placements are possible, e.g., the frames being combined may be placed side by side. In some cases the compositor down samples the frames being combined, e.g., by a factor of 2, so that the composite frame 1904 is the same size, e.g., includes the same number of pixels, as one of the individual frames 1972, 1970 which are combined to form the composite frame. Note that the composite frame will include two versions of an image portion captured by an individual left eye camera and two versions of an image portion captured by an individual right eye camera with one of the individual left and right eye versions being scaled. The two versions of the same image portion correspond to a single portion of an environment, e.g., a portion of the environment captured by the camera and lens providing the pixels which are included and/or scaled and included in the composite image. This is very different from what would expect in generation of a panoramic image from multiple cameras where a single version of each portion of an environment would be included in the panoramic image not two copies of the same portion of an environment. The single composite frame is output from image compositor 1902 as combined frame 1904. By combining the images for transmission to a playback device, the method addresses the technical problem of how to efficiently communicate a stereo image pair to a playback device along with technical problems of how to capture the stereo images where an adjacent camera may obstruct a portion of a field of view.

The combined frame 1904 is input to video frame encoder 1908, which encodes the combined frame 1904 and outputs an encoded composite frame 1910, e.g., an encoded stereoscopic image frame.

In step 1912 the encoded composite frame, e.g., an encoded stereoscopic image frame, is stored and/or transmitted, e.g., to a playback device.

Figure 20:
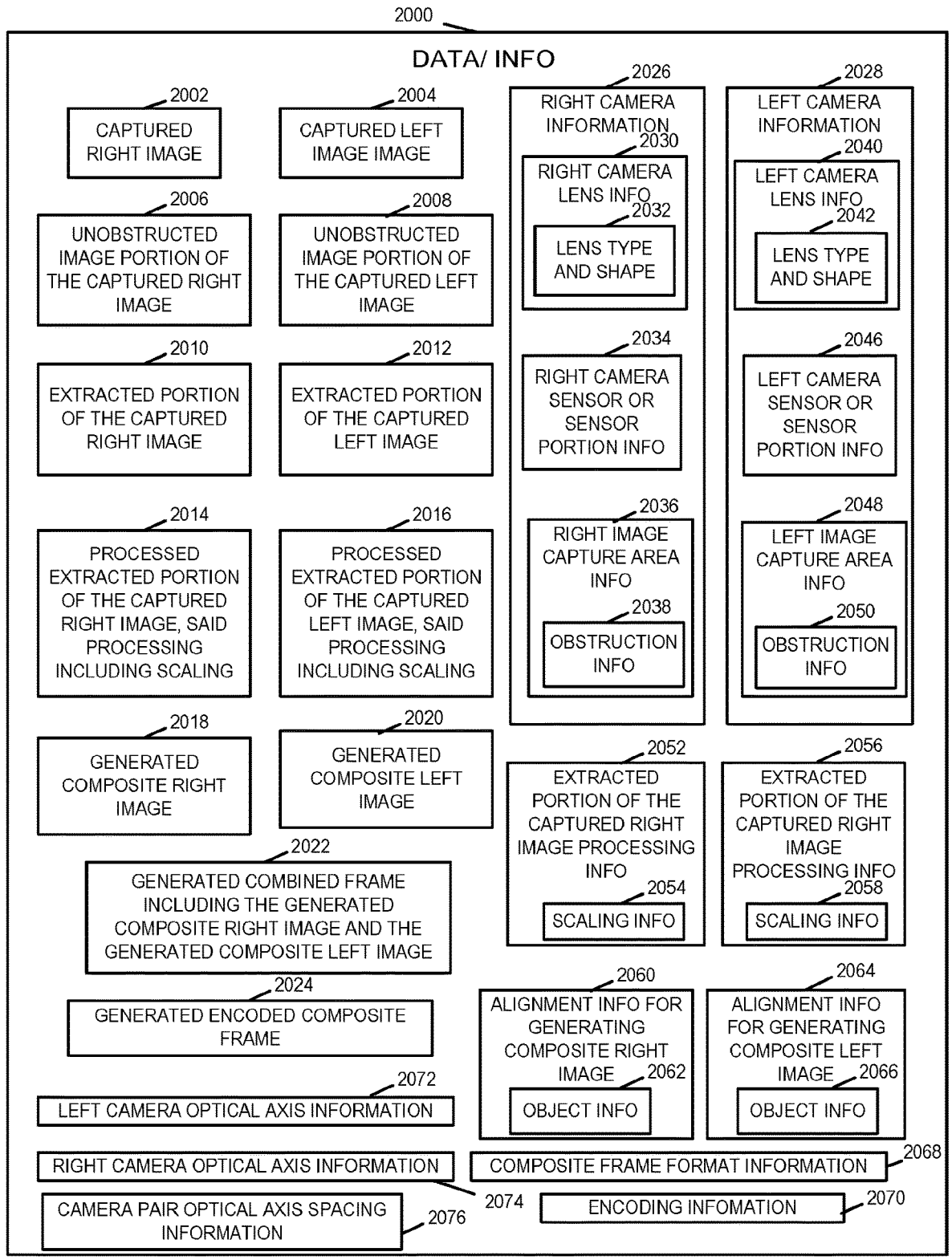
FIG. 20 is a drawing of exemplary data/information which may be including in a device or system implementing a method in accordance with an exemplary embodiment.

FIG. 20 is a drawing of exemplary data/information 2000 which may be included in a device or system, e.g., image processing and content delivery system 300, image processing and content delivery system 104, system 200, image capture system 102, or device 112, implementing a method in accordance with an exemplary embodiment. The device or system is, e.g., implementing a method in accordance with flowchart 1100 of FIG. 1100 of FIG. 10 and/or a method described with respect to FIG. 7, FIG. 17, FIG. 18 or FIG. 19.

Data/information 2000 includes a captured right image 2002, a captured left image 2004, an unobstructed image portion of the captured right image 2006, an unobstructed image portion of the captured left image 2008, an extracted portion of the captured right image 2010, an extracted portion of the captured left image 2012, a generated composite right image 2018, a generated composite left image 2020, a generated combined frame including the generated composite right image and the generated composite left image 2022, and a generated encoded composite frame 2024.

Data/information 2000 further includes right camera information 2026 and left camera information 2028. Right camera information 2026 includes right camera lens information 2030, right camera sensor information or sensor portion information 2034, and right camera capture area information 2036. Right camera lens information 2030 includes lens type information and lens shape information, e.g., information identifying the right camera lens as a particular shape and size fisheye lens, and in some embodiments, including information pertaining to a cut flat side of the lens. Right camera capture area information 2036 includes obstruction information 2038, e.g., information identifying an obstruction region in the right camera capture area, e.g., caused by a left camera lens mounted adjacent the right camera lens.

Left camera information 2028 includes left camera lens information 2040, left camera sensor information or sensor portion information 2046, and left camera capture area information 2048. Left camera lens information 2040 includes lens type information and lens shape information, e.g., information identifying the left camera lens as a particular shape and size fisheye lens, and in some embodiments, including information pertaining to a cut flat side of the lens. Left camera capture area information 2048 includes obstruction information 2050, e.g., information identifying an obstruction region in the left camera capture area, e.g., caused by a right camera lens mounted adjacent the left camera lens.

Data/information 2000 further includes extracted portion of the captured right image processing information 2052 including scaling information 2054, e.g., information indicating an scaling value to perform a reduction, extracted portion of the captured left image processing information 2056 including scaling information 2058, e.g., information indicating an scaling value to perform a reduction, alignment information for generating a composite right image 2060, and alignment information for generating a composite left image 2064. Alignment information 2060 includes object information 2062, which includes information, e.g., location information, regarding objects of which portion appear in both the unobstructed image portion of the captured right image and the processed extracted portion of the captured left image, said objects being utilized to align the two image portions. Alignment information 2064 includes object information 2066, which includes information, e.g., location information, regarding objects of which portion appear in both the unobstructed image portion of the captured left image and the processed extracted portion of the captured right image, said objects being utilized to align the two image portions.

Data/information 2000 further includes composite frame format information 2068 used for generating a combined frame, and encoding information 2070 used for generating the encoded composite frame.

Data/information 2000 further includes left camera optical axis information 2072, right camera optical axis information 2074, and camera pair optical axis spacing information 2076. In some embodiments, the optical axis information 2072, 2074 indicates that the optical axis of the left camera is parallel the optical axis of the right camera, and the camera pair optical axis spacing information indicates the optical axis spacing between the left and right camera is the same or substantially the same as the eye spacing between a typical human person's left and right eyes.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the system 300 or elements therein such as the processor 308, to perform the functions of corresponding steps of the methods of the present invention. Similarly the modules illustrated in FIG. 4 control and/or configure the system 400 or elements therein such as the processor 408, to perform the functions of corresponding steps of the methods of the present invention.

First Numbered List of Exemplary Method Embodiments

Method Embodiment 1 An image processing method, the method comprising: receiving a left image including a first obstructed image portion; receiving a right image; and generating a composite left image by replacing the first obstructed image portion with a processed portion of said right image.

Method Embodiment 2 The method of Method Embodiment 1, further comprising: storing said generated composite left image or communicating said generated composite left image to a playback device.

Method Embodiment 3 The method of Method Embodiment 1, wherein said left image is an image that was captured by a left side camera of a stereoscopic camera pair; wherein said right image is an image that was captured by a right side camera of the stereoscopic camera pair; and wherein said first obstructed image portion is an outside left portion of said left image which was obstructed by a camera lens of said right side camera.

Method Embodiment 4 The method of Method Embodiment 3, further comprising: generating said processed portion of said right image from the right image, said generating said processed portion of the right image including performing a scaling operation on at least a portion of said right image.

Method Embodiment 5 The method of Method Embodiment 4, wherein said scaling operation includes scaling to reduce the size of one or more objects in said portion of said right image.

Method Embodiment 6 The method of Method Embodiment 4, wherein generating a composite left image by replacing the first obstructed image portion with the processed portion of said right image includes: aligning a portion of an object in an unobstructed portion of the left image with a corresponding portion of the object included in the scaled portion of said right image; and combining the unobstructed portion of the left image with the aligned scaled portion of said right image to generate said composite left image.

Method Embodiment 7 The method of Method Embodiment 6, wherein said composite left image includes image content corresponding to a field of view greater than 180 degrees.

Method Embodiment 8 The method of Method Embodiment 7, wherein said left side camera and said right side camera of said stereoscopic camera pair have parallel optical axis (e.g., the optical axis do not diverge or converge and the two cameras point straight out).

Method Embodiment 9 The method of Method Embodiment 8, wherein said lens of the left side camera is a first fish eye lens and the lens of the right side camera is a second fish eye lens, the first fish eye lens obstructing the left side of the right side camera's field of view and the second fish eye lens obstructing the right side of the left side camera's field of view.

Method Embodiment 10 The method of Method Embodiment 3, wherein the right image includes a second obstructed image portion; and wherein the method further comprises: generating a composite right image by replacing the second obstructed image portion with a processed portion of said left image.

Method Embodiment 11 The method of Method Embodiment 10, wherein said second obstructed image portion is an outside right portion of said right image which was obstructed by a camera lens of said left side camera.

Method Embodiment 12 The method of Method Embodiment 11, further comprising: generating said processed portion of said left image from the left image, said generating said processed portion of the left eye image including performing a scaling operation on at least a portion of said left image.

Method Embodiment 13 The method of Method Embodiment 12, wherein said scaling operation includes scaling to reduce the size of one or more objects in said portion of said left image.

Method Embodiment 14 The method of Method Embodiment 13, wherein generating a composite right image by replacing the second obstructed image portion with the processed portion of said left image includes: aligning a portion of an object in an unobstructed portion of the right image with a corresponding portion of the object included in the scaled portion of said left image; and combining the unobstructed portion of the right image with the aligned scaled portion of said left image to generate said composite right image.

Method Embodiment 15 The method of Method Embodiment 14, further comprising: combining the composite left image and composite right image into a single frame; encoding said frame to generate an encoded stereoscopic image frame; and transmitting the generated encoded stereoscopic image frame to stereoscopic playback device.

Second Numbered List of Exemplary Method Embodiments

Method Embodiment 1 An image processing method, the method comprising: receiving (1104) a left image (608) captured by a left side camera (204) of a camera pair (202), said left image (608) including a first unobstructed image portion (618); receiving (1106) a right image (606) captured by a right side camera (203) of said camera pair (202); and generating (1112) a composite left image (772) by combining the first unobstructed image portion (618) with a processed portion (780) of said right image (606).

Method Embodiment 2 The method of Method Embodiment 1, wherein the first unobstructed image portion (618) is unscaled.

Method Embodiment 3 The method of Method Embodiment 1, wherein said left side camera (204) and said right side camera (203) are cameras of a stereoscopic camera pair (202), the left side camera (204) being in closer proximity to the right side camera (203) than the left and right side cameras (204, 203) are to any other cameras (208, 210, 214, 216).

Method Embodiment 4 The method of Method Embodiment 1, wherein combining (1116) the first unobstructed image portion (618) with the processed portion (780) of said right image (606) includes replacing (1117) an obstructed image portion (620) of the left image (608) with the processed portion (780) of said right image (606).

Method Embodiment 5 The method of Method Embodiment 1, further comprising: storing (1124) said generated composite left image (772) or communicating said generated composite left image (772) to a playback device (122).

Method Embodiment 6 The method of Method Embodiment 4, wherein said left image (608) is an image that was captured by a left side camera (204) of a stereoscopic camera pair (202); wherein said right image (606) is an image that was captured by a right side camera (203) of the stereoscopic camera pair (202); and wherein said first unobstructed image portion (618) is an outside left portion of said left image (608), said left image (608) further including the obstructed portion (620), said obstructed portion (620) being a right inside portion of said left image (608) which is obstructed by a camera lens (2) of said right side camera (203).

Method Embodiment 7 The method of Method Embodiment 5, further comprising: generating (1108) said processed portion (780) of said right image (780) from the right image (606), said generating said processed portion of the right image including performing a scaling (1109) operation on at least a portion (617) of said right image (606).

Method Embodiment 8 The method of Method Embodiment 7, wherein said scaling operation (1109) includes scaling to reduce the size of one or more objects in said portion (617) of said right image (606).

Method Embodiment 9 The method of Method Embodiment 7, wherein generating (112) a composite left image (772) includes: aligning (1114) a portion of an object in an unobstructed portion of the left image with a corresponding portion of the object included in the scaled portion of said right image; and combining (1116) the unobstructed portion of the left image with the aligned scaled portion of said right image to generate said composite left image.

Method Embodiment 10 The method of Method Embodiment 9, wherein said composite left image (772) includes image content corresponding to a field of view greater than 180 degrees.

Method Embodiment 11 The method of Method Embodiment 10, wherein said left side camera (204) and said right side camera (203) of said stereoscopic camera pair (202) have parallel optical axis (e.g., the optical axis do not diverge or converge and the two cameras (203, 204) point straight out).

Method Embodiment 12 The method of Method Embodiment 11, wherein said lens (3) of the left side camera (204) is a first fish eye lens (3) and the lens (2) of the right side camera (203) is a second fish eye lens (2), the first fish eye lens (3) obstructing the left side of the right side camera's field of view and the second fish eye lens (2) obstructing the right side of the left side camera's field of view.

Method Embodiment 13 The method of Method Embodiment 6, wherein the right image (606) includes a second unobstructed image portion (614); and wherein the method further comprises: generating a composite right image (770) by combining the second unobstructed image portion (614) with a processed portion (776) of said left image (608).

Method Embodiment 14 The method of Method Embodiment 13, wherein said second unobstructed image portion (614) is an outside portion of said right image (606) which was not obstructed by the camera lens (3) of said left side camera (204).

Method Embodiment 15 The method of Method Embodiment 14, further comprising: generating (1110) said processed portion (776) of said left image (608) from the left image (608), said generating (1110) said processed portion of the left image including performing a scaling (1111) operation on at least a portion (621) of said left image (608).

Method Embodiment 16 The method of Method Embodiment 15, wherein said scaling operation (1111) includes scaling to reduce the size of one or more objects in said portion (621) of said left image (608).

Method Embodiment 17 The method of Method Embodiment 16, wherein generating (1118) a composite right image (770) includes: aligning (1120) a portion of an object in an unobstructed portion of the right image with a corresponding portion of the object included in the scaled portion of said left image; and combining (1122) the unobstructed portion (614) of the right image (606) with the aligned scaled portion of said left image to generate said composite right image (770).

Method Embodiment 18 The method of Method Embodiment 17, further comprising: combining (1128) the composite left image (772) and composite right image (770) into a single frame (1904); encoding (1130) said frame (1904) to generate an encoded stereoscopic image frame (1910); and transmitting (1132) the generated encoded stereoscopic image frame (1910) to a stereoscopic playback device (122).

1st Set of System Embodiments

System Embodiment 1 An image processing system (200), the system (200) comprising: a receiver (211 or 245) configured to receive (1104) a left image (608) captured by a left side camera (204) of a camera pair (202), said left side image (608) including a first unobstructed image portion (618) and to receive (1106) a right image (606) captured by a right side camera (203) of said camera pair (202); and a processor (207 or 240) configured to generate (1112) a composite left image (772) by combining the first unobstructed image portion (618) with a processed portion (780) of said right image (606).

System Embodiment 2 The image processing system of System Embodiment 1, wherein the first unobstructed image portion (618) is unscaled.

System Embodiment 3 The image processing system of System Embodiment 1, wherein said left side camera (204) and said right side camera (203) are cameras of a stereoscopic camera pair (202), the left side camera (204) being in closer proximity to the right side camera (203) than the left and right side cameras (204, 203) are to any other cameras (208, 210, 214, 216).

System Embodiment 4 The image processing system (200) of System Embodiment 1, wherein said processor (207 or 240) is configured, as part of being configured to combine (1116) the first unobstructed image portion (618) with the processed portion (780) of said right image (606), to replace (1117) an obstructed image portion (620) of the left image (608) with the processed portion (780) of said right image (606).

System Embodiment 5 The image processing system (200) of System Embodiment 1, further comprising: a memory (213 or 250) storing (1124) said generated composite left image (772) or communicating said generated composite left image (772) to a playback device (122).

System Embodiment 6 The image processing system (200) of System Embodiment 4, wherein said left image (608) is an image that was captured by a left side camera (204) of a stereoscopic camera pair (202); wherein said right image (606) is an image that was captured by a right side camera (203) of the stereoscopic camera pair (202); and wherein said first unobstructed image portion (618) is an outside left portion of said left image (608), said left image (608) further including the obstructed portion (620), said obstructed portion (620) being a right inside portion of said left image (608) which is obstructed by a camera lens (2) of said right side camera (203).

System Embodiment 7 The image processing system (200) of System Embodiment 5, wherein the processor (207 or 240) is further configured to: generate (1108) said processed portion (780) of said right image (606) from the right image (606), by performing at least a scaling (1109) operation on at least a portion (617) of said right image (606).

System Embodiment 8 The image processing system (200) of System Embodiment 7, wherein said scaling operation (1109) includes scaling to reduce the size of one or more objects in said portion (617) of said right image (606).

System Embodiment 9 The image processing system (200) of System Embodiment 7, wherein the processor (207 or 240) is further configured, as part of being configured to generate (1112) a composite left image (772), to: align (1114) a portion of an object in an unobstructed portion of the left image with a corresponding portion of the object included in the scaled portion of said right image; and combine (1116) the unobstructed portion (618) of the left image (608) with the aligned scaled portion of said right image to generate said composite left image (772).

System Embodiment 10 The image processing system (200) of System Embodiment 9, wherein said composite left image (772) includes image content corresponding to a field of view greater than 180 degrees.

System Embodiment 11 The image processing system (200) of System Embodiment 10, further comprising: said left side camera (204) and said right side camera (203) of said stereoscopic camera pair (202), said left side camera (204) and said right side camera (203) having parallel optical axis (e.g., the optical axis do not diverge or converge and the two cameras (203, 204) point straight out).

System Embodiment 12 The image processing system (200) of System Embodiment 11, wherein said lens (3) of the left side camera (204) is a first fish eye lens (3) and the lens (2) of the right side camera (203) is a second fish eye lens (2), the first fish eye lens (3) obstructing the left side of the right side camera's field of view and the second fish eye lens (2) obstructing the right side of the left side camera's field of view.

System Embodiment 13 The image processing system (200) of System Embodiment 6, wherein the right image (606) includes a second unobstructed image portion (614); and wherein the processor (207 or 240) is further configured to: generate a composite right image (770) by combining the second unobstructed image portion (614) with a processed portion (776) of said left image (608).

System Embodiment 14 The image processing system (200) of System Embodiment 13, wherein said second unobstructed image portion (614) is an outside portion of said right image (606) which was not obstructed by the camera lens (3) of said left side camera (204).

System Embodiment 15 The image processing system (200) of System Embodiment 14, wherein said processor (207 or 240) is further configured to: generate (1110) said processed portion (776) of said left image from the left image (608), said generating (1110) said processed portion of the left image including performing a scaling (1111) operation on at least a portion (621) of said left image (608).

System Embodiment 16 The image processing system (200) of System Embodiment 15, wherein said processor (207 or 240) is configured, as part of being configured to perform said scaling operation (1111), to perform scaling to reduce the size of one or more objects in said portion (621) of said left image (608).

System Embodiment 17 The image processing system (200) of System Embodiment 16, wherein the processor (207 or 240) is further configured, as being part of being configured to generate a composite right image (770), to: align (1120) a portion of an object in an unobstructed portion of the right image with a corresponding portion of the object included in the scaled portion of said left image; and combine (1122) the unobstructed portion of the right image (614) with the aligned scaled portion of said left image to generate said composite right image (770).

System Embodiment 18 The image processing system (200) of System Embodiment 17, wherein the processor (207 or 240) is further configured to: combine (1128) the composite left image (772) and composite right image (770) into a single frame (1904); encode (1130) said frame (1904) to generate an encoded stereoscopic image frame (1910); and transmit (1132) the generated encoded stereoscopic image frame (1912) to stereoscopic playback device (122).

Machine Readable Medium Embodiment

Machine readable medium Embodiment 1 A non-transitory computer readable medium (250) including machine executable instructions which, when executed by a processor (240) of an apparatus (112) control the apparatus (112) to perform the steps of: receiving (1104) a left image (608) captured by a left side camera (204) of a camera pair (202), said left image (608) including a first unobstructed image portion (618); receiving (1106) a right image (606) captured by a right side camera (203) of said camera pair (202); and generating (1112) a composite left image (772) by combining the first unobstructed image portion (618) with a processed portion (780) of said right image (606).

Numbered Set of Apparatus Embodiments

Apparatus Embodiment 1 A camera device (802 or 902 or 1302 or 1402 or 1502 or 1602), comprising: a first fish eye lens (812 or 912 or 1312 or 1612) having a first flat portion (867 or 967 or 1367 or 1667) on one side; a second fish eye lens (810 or 910 or 1310 or 1610) having a second flat portion (865 or 965 or 1365 or 1665) on one side; and at least one sensor (816, 814 or 913 or 1616, 1614) positioned behind at least one of said first fish eye lens (812 or 912 or 1312 or 1612) and said second fish eye lens (810 or 910 or 1312 or 1610).

Apparatus Embodiment 2. The camera device (802 or 902 or 1302 or 1402 or 1502 or 1602) of Apparatus Embodiment 1, where said first flat portion (867 or 967 or 1367 or 1667) of said first fish eye lens (812 or 912 or 1312 or 1612) is positioned adjacent the second flat portion (865 or 965 or 1365 or 1665) of said second fish eye lens (810 or 910 or 1310 or 1610).

Apparatus Embodiment 3. The camera device (1602) of Apparatus Embodiment 2, wherein said first flat portion (1667) extends from a front portion (1685) of said first fish eye lens (1612) toward a rear portion (1687) of said first fish eye lens (1612); and wherein said second flat portion (1665) extends from a front portion (1689) of said second fish eye lens (1610) toward a rear portion (1681) of said second fish eye lens (1610).

Apparatus Embodiment 4. The camera device (802 or 1602) of Apparatus Embodiment 1, wherein said first sensor (816 or 1616) is positioned behind said first fish eye lens (812 or 1612); and wherein the camera device (802 or 1602) further include a second sensor (814 or 1614) positioned between the second fish eye lens (812 or 1610).

Apparatus Embodiment 5. The camera device (802 or 1602) of Apparatus Embodiment 4, further comprising: a controller (205) for controlling said first and second sensors ((816, 814) or (1616, 1614) to capture first and second images, respectively, in a synchronized manner (e.g., at the same time).

Apparatus Embodiment 6. The camera device (802 or 1602) of Apparatus Embodiment 5, wherein said first and second sensors ((816, 814) or (1616, 1614) are sensors of the same type, said sensor of the same type having the same number of rows of pixel elements for capturing pixel values and being of the same size.

Apparatus Embodiment 7. The camera device (902) of Apparatus Embodiment 1, wherein said first sensor (913) is positioned behind both said first and second fish eye lenses (912, 910) and captures images of light passing through both said first and second fish eye lenses (912, 910).

Apparatus Embodiment 8. The camera device (802 or 902 or 1302 or 1402 or 1502 or 1602) of any of the preceding Apparatus Embodiments wherein the optical axis (1362, 1360) or (1662, 1660) of the first and second fish eye lenses ((812, 810) or (912, 910) or (1312, 1310) or (1612, 1610)) extend parallel to one another.

Apparatus Embodiment 9. The camera device (802 or 902 or 1302 or 1402 or 1502 or 1602) of Apparatus Embodiment 8, wherein the optical axis (1362 or 1662) of the first fish eye (812 or 912 or 1312 or 1612) lens extends parallel to the flat surface (867 or 967 or 1367 or 1667) of the first fish eye lens (812 or 912 or 1312 or 1612) and wherein the optical axis (1360 or 1660) of the second fish eye lens (810 or 910 or 1310) extends parallel to the flat surface (865 or 965 or 1365 or 1367) of the second fish eye lens (810 or 910 or 1310 or 1610).

Apparatus Embodiment 10. The camera device (802 or 902 or 1302 or 1402 or 1502 or 1602) of Apparatus Embodiment 9 wherein the spacing (1372 or 1672) between the optical axis (1362 or 1662) of the first fish eye lens (812 or 912 or 1312 or 1612) and the optical axis (1360 or 1660) of the second fish eye lens (810 or 910 or 1310 or 1612) approximate or match the average spacing between the optical axis of an human being's left and right eyes.

Apparatus Embodiment 11. The camera device (1302 or 1402 or 1502) of Apparatus Embodiment 9 or 10, wherein the distance from the optical axis (1362) of the first fish eye lens (1312) and the outermost edge (1366) of the first fish eye lens (1312) is greater than the distance (1372) between the optical axis (1362) of the first fish eye lens (1312) and the optical axis (1360) of the second fish eye lens (1310).

Apparatus Embodiment 12. The camera device (1402 or 1502 or 1602) of Apparatus Embodiment 2, wherein the first fish eye lens (1312 or 1612) is a camera lens of a left camera (1408 or 1508 or 1608) of a stereoscopic camera pair (1402 or 1602) and has an edge (1366 or 1666) which is opposite said flat (e.g., cut) portion (1367 or 1667) of the first lens (1312 or 1612), said edge (1366 or 1666) of the first fish eye lens (1312 or 1612) extending beyond a side (1413 or 1613) of a left camera body (1409 or 1509 or 1609) of said left camera (1408 or 1608); and wherein the second fish eye lens (1310 or 1610) is a camera lens of a right camera (1406 or 1606) of the stereoscopic camera pair (1402 or 1502 or 1606) and has an edge (1364 or 1664) which is opposite said flat (e.g., cut) portion (1365 or 1665) of the second lens (1310 or 1610), said edge (1364 or 1664) of the second fish eye lens (1310 or 1610) extending beyond a side (1411 or 1511 or 1611) of a right camera body (1407 or 1607) of said right camera (1406 or 1606).

Apparatus Embodiment 13. The camera device (1402 or 1502 or 1602) of Apparatus Embodiment 12, wherein said flat portion (1367 or 1667) of said first fish eye lens (1312 or 1612) ends at a side (1417 or 1517 or 1617) of the left camera body (1409 or 1509 or 1609) of the left camera (1408 or 1508 or 1608) and the flat portion (1367 or 1665) of the second fish eye lens (1310 or 1610) ends at a side (1415 or 1515 or 1615) of the right camera body (1407 or 1507 or 1607) of the second camera (1406 or 1506 or 1606).

Apparatus Embodiment 14. The camera device (1402 or 1502 or 1602) of Apparatus Embodiment 12, wherein the first fish eye lens (1312 or 1612) directs light entering the edge (1680) of the lens (1312 or 1612) extending beyond the edge (1413 or 1513 or 1613) of the first camera body (1409 or 1509 or 1609) of the first camera (1408 or 1508 or 1608) onto the first sensor (1616).

Apparatus Embodiment 15. The camera device (1402 or 1502 or 1602) of Apparatus Embodiment 14, wherein the first fish eye lens (1312 or 1612) is a left camera lens having a left side field of view of said left lens extends beyond 90 degrees (1673) from the optical axis (1662) of the left lens (1312 or 1612).

Apparatus Embodiment 16. The camera device (1402 or 1502 or 1602) of Apparatus Embodiment 15, wherein the second fish eye lens (1310 or 1610) is a right camera lens having a right side field of view that extends beyond 90 degrees (1671) from the optical axis (1660) of the right lens (1310 or 1610).

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

In stereoscopic embodiments different left and right images are received in the same or different frames and combined with additional image content. The left and right eye images are rendered separately in the manner described above with regard to a single image rendering operation but then displayed to a user at the same time with the left eye being displayed a left eye image and the right eye being displayed a right eye image. Differences between the left and right eye images provide a sense of depth to the view. A head mounted display is used in some embodiments with the display including left and right eye image display portions which can and normally are be used to display the corresponding rendered left and right eye images, respectively. Thus it should be appreciated that the methods and apparatus of the present invention are well suited for non-stereoscopic as well as stereoscopic playback systems.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

In some embodiments each of the steps of the described method is performed by a processor or under the control of a processor. Various features address technical problems of how to encode and/or communicate video of a communications network such as the Internet. Various features also address how to use the limited space of a frame to communicate an image of a portion of an environment along with other content such as a logo, text, or a texture that was not in the environment but maybe combined during rendering with an image of an environment.

Numerous additional variations on the methods and apparatus of the various embodiments described above will be apparent to those skilled in the art in view of the above description. Such variations are to be considered within the scope.

What is claimed:

1. A method comprising:
   receiving a first image captured by a first camera of a camera pair, the first image comprising a first unobstructed image portion and a first obstructed image portion;
   receiving a second image captured by a second camera of the camera pair, the second image comprising a second unobstructed image portion and a second obstructed image portion obstructed by a component of the first camera;
   scaling the second unobstructed image portion to generate a scaled portion of the second image; scaling the first unobstructed image portion to generate a scaled portion of the first image;
   generating a first composite image by combining the first unobstructed image portion with the scaled portion of the second image;
   generating a second composite image by combining the second unobstructed image portion with the scaled portion of the first image; and
   combining the first composite image and the second composite image into a single frame.

2. The method of claim 1, further comprising:
   encoding the single frame to generate an encoded stereoscopic image frame.

3. The method of claim 2, further comprising transmitting the encoded stereoscopic image frame to a stereoscopic playback device.

4. The method of claim 1, wherein the first camera comprises a first fisheye lens, and wherein the first fisheye lens obstructs a portion of a field of view of the second camera adjacent to the first camera.

5. The method of claim 1, wherein generating the first composite image comprises:
   aligning at least a portion of an object in the scaled portion of the second image with a corresponding portion of the object in the first unobstructed portion of the first image; and
   combining the scaled portion of the second image with the first unobstructed portion of the first image.

6. The method of claim 1, wherein the first camera comprises a first asymmetric lens, and wherein the second camera comprises a second asymmetric lens.

7. A non-transitory computer readable medium comprising computer readable code executable by one or more processors to:
   receive a first image captured by a first camera of a camera pair, the first image comprising a first unobstructed image portion and a first obstructed image portion;
   receive a second image captured by a second camera of the camera pair, the second image comprising a second unobstructed image portion and a second obstructed image portion obstructed by a component of the first camera;
   scale the second unobstructed image portion to generate a scaled portion of the second image; scale the first unobstructed image portion to generate a scaled portion of the first image;
   generate a first composite image by combining the first unobstructed image portion with the scaled portion of the second image;
   generate a second composite image by combining the second unobstructed image portion with the scaled portion of the first image; and
   combine the first composite image and the second composite image into a single frame.

8. The non-transitory computer readable medium of claim 7, further comprising computer readable code to:
   encode the single frame to generate an encoded stereoscopic image frame.

9. The non-transitory computer readable medium of claim 8, further comprising computer readable code to:
   transmit the encoded stereoscopic image frame to a stereoscopic playback device.

10. The non-transitory computer readable medium of claim 8, wherein the computer readable code to generate the first composite image comprises computer readable code to:
    align at least a portion of an object in the scaled portion of the second image with a corresponding portion of the object in the first unobstructed portion of the first image; and
    combine the scaled portion of the second image with the first unobstructed portion of the first image.

11. The non-transitory computer readable medium of claim 7, wherein the first camera comprises a first fisheye lens, and wherein the first fisheye lens obstructs a portion of a field of view of the second camera adjacent to the first camera.

12. The non-transitory computer readable medium of claim 7, wherein the first camera comprises a first asymmetric lens, and wherein the second camera comprises a second asymmetric lens.

13. A system comprising:
    one or more processors; and
    one or more computer readable media comprising computer readable code executable by the one or more processors to:
    receive a first image captured by a first camera of a camera pair, the first image comprising a first unobstructed image portion and a first obstructed image portion;
    receive a second image captured by a second camera of the camera pair, the second image comprising a second unobstructed image portion and a second obstructed image portion obstructed by a component of the first camera;
    scale the second unobstructed image portion to generate a scaled portion of the second image;
    scale the first unobstructed image portion to generate a scaled portion of the first image;
    generate a first composite image by combining the first unobstructed image portion with the scaled portion of the second image;
    generate a second composite image by combining the second unobstructed image portion with the scaled portion of the first image; and combine the first composite image and the second composite image into a single frame.

14. The system of claim 13, further comprising computer readable code to:
encode the single frame to generate an encoded stereoscopic image frame.

15. The system of claim 14, further comprising computer readable code to:
transmit the encoded stereoscopic image frame to a stereoscopic playback device.

16. The system of claim 14, wherein the computer readable code to generate the first composite image comprises computer readable code to:
align at least a portion of an object in the scaled portion of the second image with a corresponding portion of the object in the first unobstructed portion of the first image; and
combine the scaled portion of the second image with the first unobstructed portion of the first image.

17. The system of claim 13, wherein the first camera comprises a first fisheye lens, and wherein the first fisheye lens obstructs a portion of a field of view of the second camera adjacent to the first camera.

\* \* \* \* \*